(12) United States Patent
Mizukoshi et al.

(10) Patent No.: US 8,008,805 B2
(45) Date of Patent: Aug. 30, 2011

(54) POWER CONVERSION APPARATUS AND MOTOR DRIVE SYSTEM

(75) Inventors: Yukio Mizukoshi, Machida (JP); Yuki Nakajima, Yokohama (JP); Tomoya Imazu, Yokohama (JP); Yoshiyuki Nagai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 800 days.

(21) Appl. No.: 11/946,656

(22) Filed: Nov. 28, 2007

(65) Prior Publication Data
US 2008/0136265 A1 Jun. 12, 2008

(30) Foreign Application Priority Data

Dec. 7, 2006 (JP) .................................. 2006-330855
Oct. 22, 2007 (JP) .................................. 2007-273842

(51) Int. Cl.
*H02J 7/34* (2006.01)
*H02J 1/10* (2006.01)
*H02J 3/38* (2006.01)

(52) U.S. Cl. ........................................................ 307/51
(58) Field of Classification Search .................... 307/89, 307/51
See application file for complete search history.

(56) References Cited

U.S. PATENT DOCUMENTS
2006/0028848 A1 * 2/2006 Lai et al. .......................... 363/39
2008/0252142 A1 * 10/2008 Davies et al. .................... 307/42

FOREIGN PATENT DOCUMENTS
JP H07-245968 9/1995
JP H09-47035 2/1997

* cited by examiner

*Primary Examiner* — Rexford Barnie
*Assistant Examiner* — Dru Parries
(74) *Attorney, Agent, or Firm* — Global IP Counselors, LLP

(57) ABSTRACT

A power conversion apparatus includes a plurality of power modules, a plurality of capacitors and a bus bar. Each of the power modules has a direct current terminal section and an alternating current terminal section. Each of the power modules is configured and arranged to convert a direct current inputted from the direct current terminal section into a respective phase of a multiple-phase alternating current and to output the multiple-phase alternating current to the alternating current terminal section. Each of the capacitors is arranged with respect to a corresponding one of the power modules. The bus bar forms an inter-phase current path between the power modules that are adjacent and forms an intra-phase current path between one of the power modules and a corresponding one of the capacitors such that an impedance of the inter-phase current path is smaller than an impedance of the intra-phase current path.

20 Claims, 13 Drawing Sheets

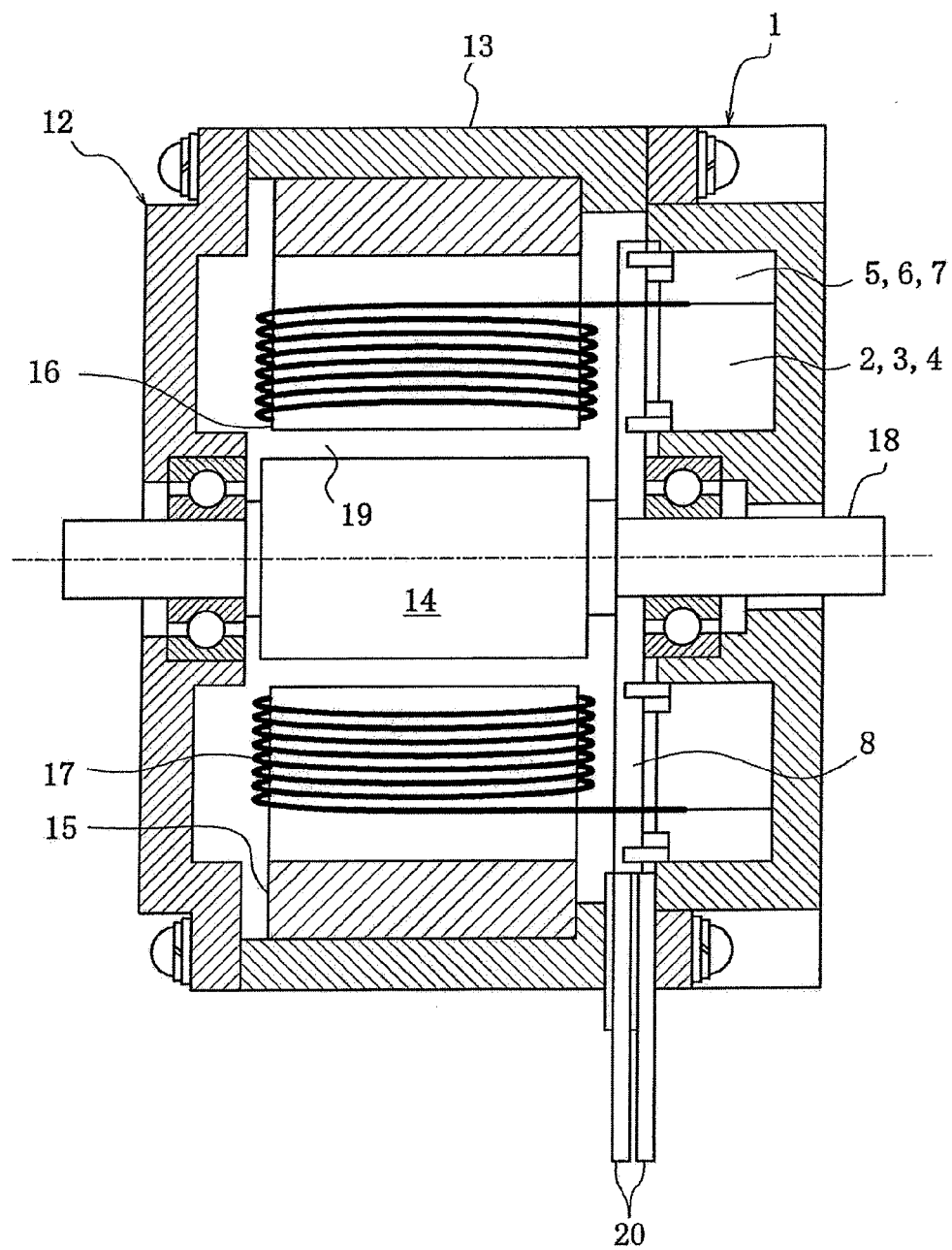
F I G. 1

F I G. 9A
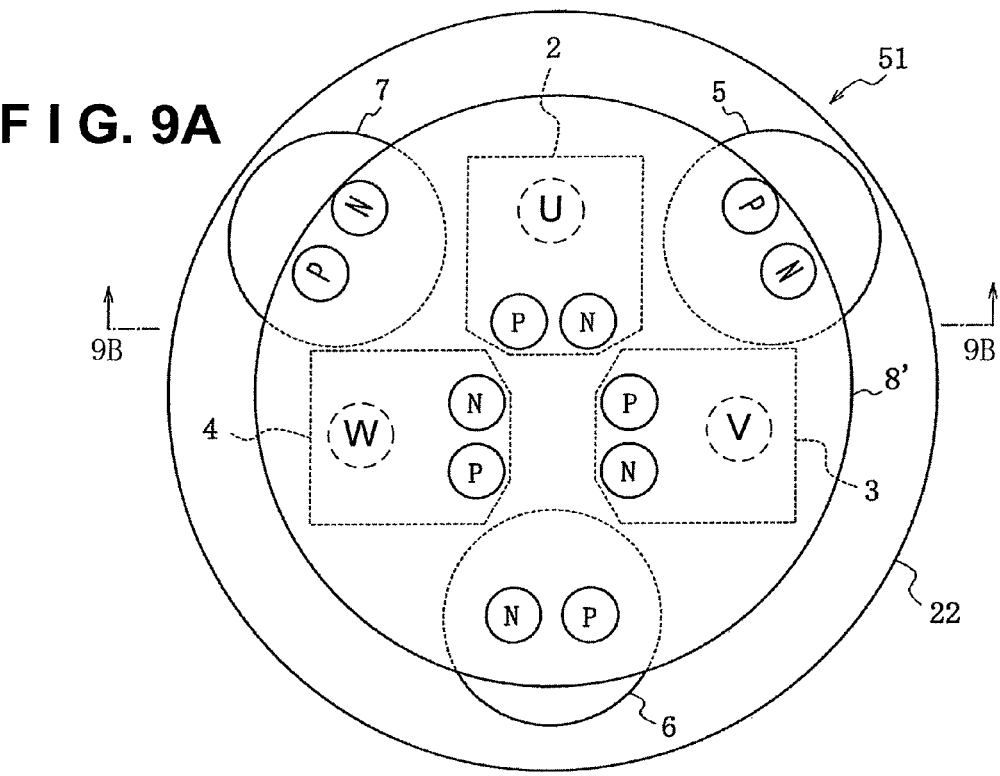
F I G. 9B
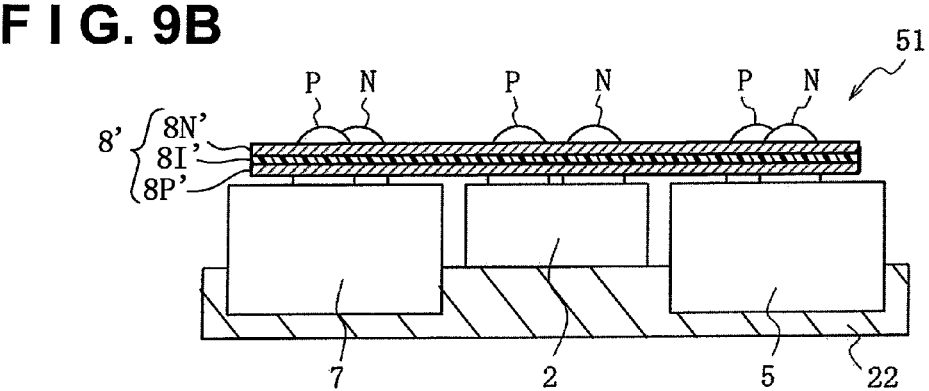

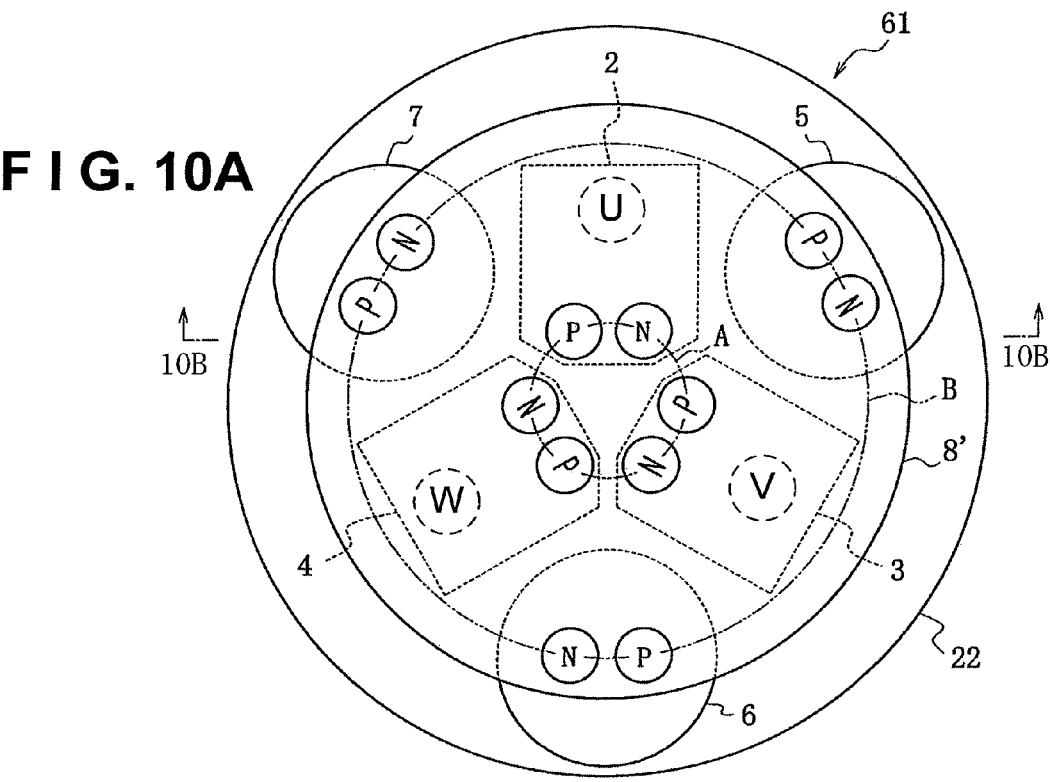
F I G. 10A
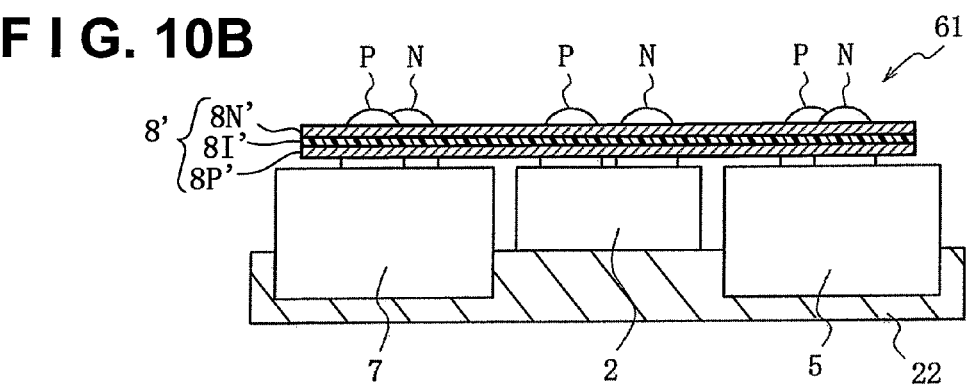
F I G. 10B

POWER CONVERSION APPARATUS AND MOTOR DRIVE SYSTEM

CROSS-REFERENCE TO RELATED APPLICATIONS

This application claims priority to Japanese Patent Application No. 2006-330855, filed on Dec. 7, 2006, and No. 2007-273842 filed on Oct. 22, 2007. The entire disclosures of Japanese Patent Application Nos. 2006-330855 and 2007-273842 are hereby incorporated herein by reference.

BACKGROUND OF THE INVENTION

1. Field of the Invention

The present invention relates to an arrangement of power modules and an arrangement of capacitors provided inside a power conversion apparatus.

2. Background Information

Generally speaking, a main component of a power conversion apparatus (such as an inverter) is a power module, which is also called a switching module or a semiconductor module. The power module typically has two power transistors connected in series, and two diodes connected in antiparallel to the corresponding power transistors. The power module serves the important task of converting a direct current received from a power source into an alternating current and outputting the alternating current.

For example, Japanese Laid-Open Patent Application Publication No. 7-245968 discloses an inverter apparatus having a direct current input section comprising positive and negative terminals connected to a power source and a plurality of power modules arranged radially so as to be centered about the direct current input section. At least one power module is required for each phase of the alternating current. Thus, the number of power modules is at least equal to the number of phases of the alternating current. If the number of phases of the alternating current is three, then the power conversion apparatus has at least three power modules. When the power modules convert a direct current into an alternating current, the switching operation of the power modules causes high frequency ripple currents to occur. Additionally, surge voltages occur when the power modules are turned off. Therefore, it is necessary to provide a capacitor to smooth the ripple currents and to absorb the surge voltages.

In the inverter apparatus described in the above mentioned reference, the direct current input section of each power module is formed as an integral unit with positive and negative electrodes being separated by an insulating layer, and arranged on an upper portion of the power module. A plurality of capacitors are provided so that one capacitor is arranged on an upper portion of the electrodes of each power module and connected such that the impedance between the power module and the capacitor is low. This arrangement provides a compact power conversion apparatus with low impedance between the power modules and capacitors.

In view of the above, it will be apparent to those skilled in the art from this disclosure that there exists a need for an improved power conversion apparatus and motor drive system. This invention addresses this need in the art as well as other needs, which will become apparent to those skilled in the art from this disclosure.

SUMMARY OF THE INVENTION

Although the inverter apparatus disclosed in the above mentioned reference achieves low impedance between the power modules and the corresponding capacitors, such inverter apparatus is unable to lower the loads carried by the capacitors. Also, the inverter apparatus disclosed in the above mentioned reference is unable to contribute to reducing the sizes of the capacitors themselves.

The present invention was conceived in view of these shortcomings. One object of the present invention is to provide a power conversion apparatus that can prevent a surge current flowing to the power modules from becoming large and that can reduce the size of the capacitors.

In order to achieve the above mentioned object of the present invention, a power conversion apparatus includes a plurality of power modules, a plurality of capacitors and a bus bar. Each of the power modules has a direct current terminal section and an alternating current terminal section. Each of the power modules is configured and arranged to convert a direct current inputted from the direct current terminal section into a respective phase of a multiple-phase alternating current and to output the multiple-phase alternating current to the alternating current terminal section. Each of the capacitors is arranged with respect to a corresponding one of the power modules. The bus bar forms an inter-phase current path between the power modules that are adjacent and forms an intra-phase current path between one of the power modules and a corresponding one of the capacitors such that an impedance of the inter-phase current path is smaller than an impedance of the intra-phase current path.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a simplified axial cross sectional view of an electromechanical motor equipped with a power conversion apparatus in accordance with a first embodiment of the present invention;

FIG. 9A is a schematic plan view illustrating an arrangement of power modules and capacitors of a power conversion apparatus in accordance with a fifth embodiment of the present invention;

FIG. 9B is a schematic cross sectional view of the power conversion apparatus in accordance with the fifth embodiment of the present invention as taken along a section line 9B-9B of FIG. 9A;

FIG. 10A is a schematic plan view illustrating an arrangement of power modules and capacitors of a power conversion apparatus in accordance with a sixth embodiment of the present invention;

FIG. 10B is a schematic cross sectional view of the power conversion apparatus in accordance with the sixth embodiment of the present invention as taken along a section line 10B-10B of FIG. 10A;

DETAILED DESCRIPTION OF THE PREFERRED EMBODIMENTS

Figure 2:
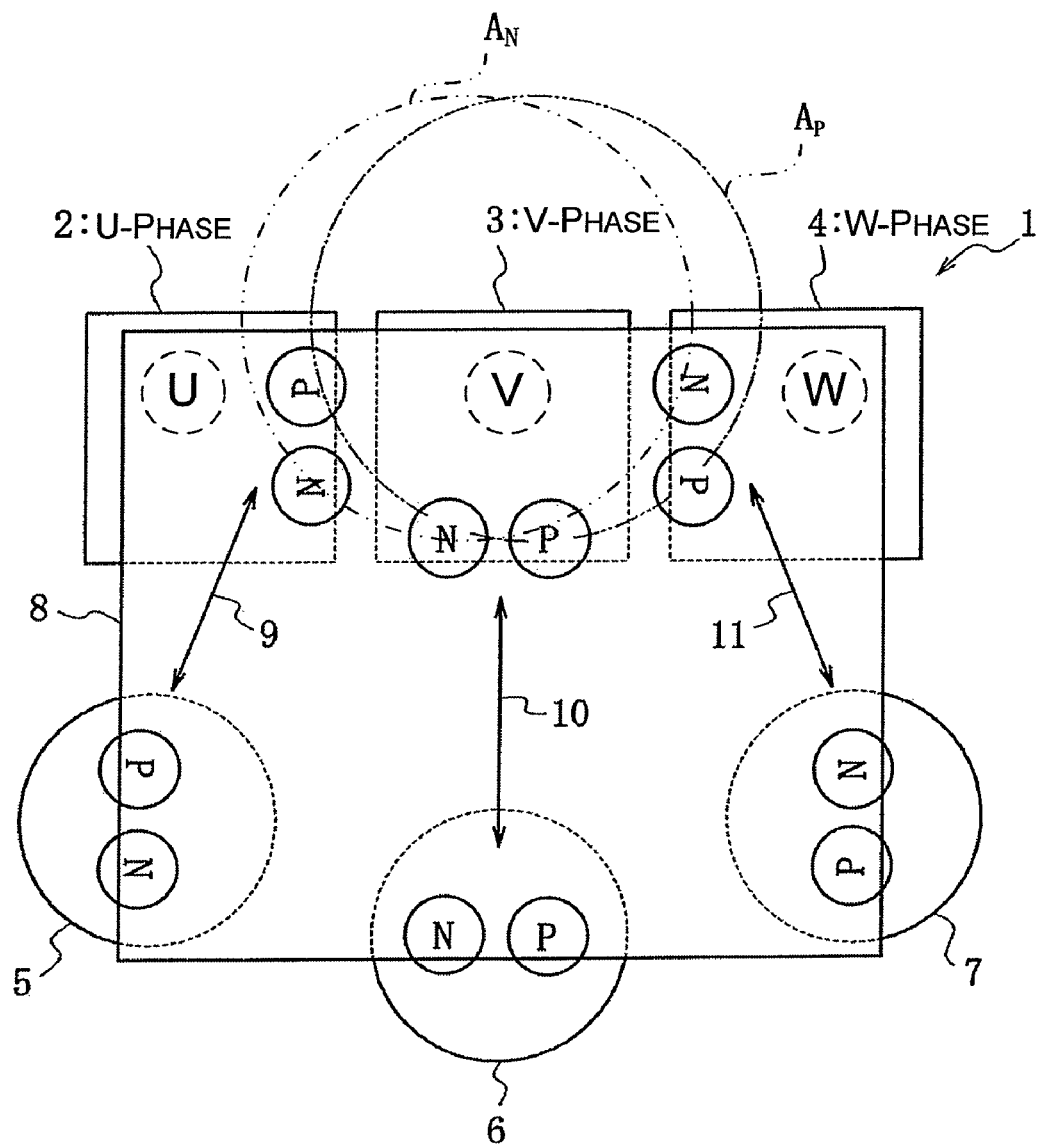
FIG. 2 is a schematic diagram for explaining an arrangement of power modules and capacitors of the power conversion apparatus in accordance with the first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a multiple-phase alternating current motor 12 equipped with a power conversion apparatus 1 in accordance with a first embodiment of the present invention is illustrated. FIG. 1 is an axial cross sectional view of the multiple-phase alternating current motor 12. The multiple-phase alternating current motor 12 is a well-known type of motor configured and arranged to operate on at least three phases of alternating current. Since such multiple-phase alternating current motor 12 is well known in the art, the structure thereof will not be discussed or illustrated in detail herein. Rather, it will be apparent to those skilled in the art from this disclosure that the components of the multiple-phase alternating current motor 12 can be any type of structure that can be used to carry out the present invention.

As shown in FIG. 1, the multiple-phase alternating current motor 12 includes the power conversion apparatus 1, a motor case 13 (motor housing unit), a cylindrical rotor 14, a hollow cylindrical stator 15, a plurality of stator cores 16, a plurality of motor coils 17, a rotary shaft 18, and a pair of power cables 20. The power conversion apparatus 1 includes a plurality of power modules 2, 3 and 4, a plurality of capacitors 5, 6 and 7 and a bus bar 8.

The motor case 13 forms an external shell of the multiple-phase alternating current motor 12 and accommodates the components of the multiple-phase alternating current motor 12 therein. The rotor 14 is axially supported in the motor case 13 such that the rotor 14 can rotate freely. The stator 15 is arranged so as to surround the rotor 14. The power conversion apparatus 1 is configured and arranged to supply electric power to the stator 15.

The stator cores 16 are provided along an internal circumferential surface of the stator 15 and arranged with equal spacing therebetween in the circumferential direction. A proximal end of each of the stator cores 16 is fixed to the internal circumferential surface of the stator 15 and a distal end of each of the stator cores 16 faces toward the external circumferential surface of the rotor 14 with a small gap 19 being formed therebetween. A conductive wire is wound around each of the stator cores 16 to form the motor coil 17. The end portion of each of the motor coils 17 is connected to a corresponding one of the power modules 2, 3 and 4 of the power conversion apparatus 1, which is arranged closely adjacent to an end surface of the stator 15. The power conversion apparatus 1 is cylindrical in shape and arranged such that the rotary shaft 18 of the rotor 14 passes therethrough.

Each of the power modules 2, 3 and 4 is paired with a corresponding one of the capacitors 5, 6 and 7 and each pair of the power module 2, 3 or 4 and the capacitor 5, 6 or 7 is arranged to correspond to one phase of the multiple-phase alternating current motor 12. The power cables 20 electrically connect the power conversion apparatus 1 to a storage battery or other direct current power source (not shown) that serves to supply the multiple-phase alternating current motor 12 with electric power. The bus bar 8 is arranged to supply direct current from the power cables 20 to the power modules 2, 3 and 4. As will be explained later, the bus bar 8 electrically connects the power modules 2, 3 and 4 together and also electrically connects each power module 2, 3 or 4 to its corresponding capacitor 5, 6 or 7.

The power modules 2, 3 and 4 are semiconductor devices configured and arranged to convert a direct current into a multiple-phase alternating current by performing switching operations. The capacitors 5, 6 and 7 are configured and arranged to reduce serge currents, ripple currents, and any other unnecessary current fluctuations accompanying the switching operations of the power modules 2, 3 and 4.

The power conversion apparatus 1, also called an inverter, is fed electric power from a storage battery or other direct current power source (not shown) and produces a multiple-phase alternating current to be supplied to the multiple-phase alternating current motor 12. An inverter is generally arranged in a position that is distant from both the storage battery and the motor. However, in the first embodiment of the present invention, the power conversion apparatus 1 is mounted directly to the motor case 13 of the multiple-phase alternating current motor 12 so as to form a single integral unit as shown in FIG. 1. A motor constructed as an integral unit with an inverter in the manner of the multiple-phase alternating current motor 12 is called an electromechanical motor or a mechatronic motor.

FIG. 2 is a schematic diagram illustrating an arrangement of the power modules 2, 3 and 4 and the capacitors 5, 6 and 7 of the power conversion apparatus 1 in accordance with the first embodiment of the present invention. The power conversion apparatus 1 is configured and arranged to convert a direct current into a three-phase alternating current. The power conversion apparatus 1 includes the U-phase power module 2, the V-phase power module 3 and the W-phase power module 4. The capacitors 5, 6 and 7 are separately provided to the U-phase, V-phase and W-phase power modules 2, 3 and 4 so as to correspond to each of the phases, respectively. As shown in FIG. 2, in the first embodiment of the present invention, the relative distances between the power modules 2, 3 and 4 (referred as "power module inter-phase distances") are smaller than the relative distances between the capacitors 5, 6 and 7 and the respective power modules 2, 3 and 4 (referred as "capacitor intra-phase distances").

Each of the power modules 2, 3 and 4 preferably has the same structure, which constitutes a well-known semiconductor module having two power transistors (e.g., switching IGBT, GTO thyrister, MOSFET) (not shown) connected in series and two diodes respectively connected in antiparallel to the corresponding power transistors. Each of the power modules 2, 3 and 4 is provided with a direct current terminal section or an input terminal including a positive electrode terminal (also referred as a "P terminal") and a negative electrode terminal (also referred as an "N terminal"), and an alternating current terminal section or an output terminal ("U, V or W terminal"). Each of the alternating current terminal sections of the power modules 2, 3 and 4 is connected to respective one of the motor coils 17.

The bus bar 8 electrically connects the positive electrode terminal of the U-phase power module 2 and the positive electrode terminal of the V-phase power module 3 together. The bus bar 8 also electrically connects the positive electrode terminal of the V-phase power module 3 and the positive electrode terminal of the W-phase power module 4 together. The bus bar 8 also electrically connects the positive electrode terminal of the W-phase power module 4 and the positive electrode terminal of the U-phase power module 2 together. The bus bar 8 also electrically connects the positive electrode of each of the power modules 2, 3 and 4 to a positive electrode terminal of a direct current voltage source (not shown).

Moreover, the bus bar 8 electrically connects the negative electrode terminal of the U-phase power module 2 and the negative electrode terminal of the V-phase power module 3 together. The bus bar 8 also electrically connects the negative electrode terminal of the V-phase power module 3 and the negative electrode terminal of the W-phase power module 4 together. The bus bar 8 also electrically connects the negative electrode terminal of the W-phase power module 4 and the negative electrode terminal of the U-phase power module 2 together. The bus bar 8 also electrically connects the negative electrode of each of the power modules 2, 3 and 4 to a negative electrode terminal of the direct current voltage source (not shown).

The positive electrode terminals of the power modules 2, 3 and 4 are electrically insulated from the negative electrode terminals of the power modules 2, 3 and 4. More specifically, the bus bar 8 preferably has a triple layered structure including a frontward (top) surface, a rearward (bottom) surface and an insulating layer disposed therebetween. The bus bar 8 is arranged such that the frontward surface electrically connects the positive terminals of the power modules 2, 3 and 4 to the positive terminal of the direct current voltage source and the rearward surface electrically connects the negative terminals of the power modules 2, 3 and 4 to the negative terminal of the direct current voltage source.

In this way, the bus bar 8 forms an inter-phase current path that electrically connects the U-phase and V-phase power modules 2 and 3, an inter-phase current path that electrically connects the V-phase and W-phase power modules 3 and 4, and an inter-phase current path that electrically connects the W-phase and U-phase power modules 4 and 2. Thus, the bus bar 8 forms inter-power module (inter-phase) current paths that electrically connect the positive electrode terminal or the negative electrode terminal of the power module corresponding to one phase to the positive electrode terminal or the negative electrode terminal of the power modules corresponding to the other phases.

Moreover, the bus bar 8 electrically connects the positive electrode terminal of the U-phase power module 2 and the positive electrode terminal of the capacitor 5 together. The bus bar 8 also electrically connects the positive electrode terminal of the V-phase power module 3 and the positive electrode terminal of the capacitor 6 together. The bus bar 8 also electrically connects the positive electrode terminal of the W-phase power module 4 and the positive electrode terminal of the capacitor 7 together.

Similarly, the bus bar 8 electrically connects the negative electrode terminal of the U-phase power module 2 and the negative electrode terminal of the capacitor 5 together. The bus bar 8 also electrically connects the negative electrode terminal of the V-phase power module 3 and the negative electrode terminal of the capacitor 6 together. The bus bar 8 also electrically connects the negative electrode terminal of the W-phase power module 4 and the negative electrode terminal of the capacitor 7 together.

The positive electrode terminals of the power modules 2, 3 and 4 and the capacitors 5, 6 and 7 are electrically insulated from the negative electrode terminals of the power modules 2, 3 and 4 and the capacitors 5, 6 and 7. Thus, the power module 2 and the capacitor 5 are arranged as a pair to correspond to the U-phase of the power conversion apparatus 1. Similarly, the power module 3 and the capacitor 6 are arranged as a pair to correspond to the V-phase of the power conversion apparatus 1, and the power module 4 and the capacitor 7 are arranged as a pair to correspond to the W-phase of the power conversion apparatus 1.

In this way, the bus bar 8 forms an intra-phase current path that electrically connects the U-phase power module 2 and the capacitor 5, an intra-phase current path that electrically connects the V-phase power module 3 and the capacitor 6, and an intra-phase current path that electrically connects the W-phase power module 4 and the capacitor 7. Thus, the bus bar 8 forms intra-phase current paths that electrically connect the power modules 2, 3 and 4 to respective one of the capacitors 5, 6 and 7 within each of the U-phase, V-phase, and W-phase of the multiple-phase alternating current motor 12.

The bus bar 8 is fabricated in advance into a shape (form) that combines a plurality of current paths (the inter-phase current paths and the intra-phase current paths) into an integral unit. More specifically, the bus bar 8 is fabricated, for example, by cutting cable-shaped conductors to appropriate lengths and gathering them together, by punching a thin plate-shaped conductor into an appropriate shape and attaching an insulator material, or by forming some other conductive material into an appropriate shape. The impedances of the inter-phase current paths between the power modules 2, 3 and 4 are generally proportional the distances between the power modules 2, 3 and 4. However, the impedances of the inter-phase current paths between the power modules 2, 3 and 4 are also affected by the shape of the bus bar 8. The impedance of the intra-phase current path of the U-phase is proportional to the intra-phase distance between the power module 2 and the capacitor 5. However, the impedance of the intra-phase current path of the U-phase is also affected by the shape of the bus bar 8. The same holds for the V-phase (e.g., between the power module 3 and the capacitor 6) and the W-phase (e.g., between the power module 4 and the capacitor 7).

Figure 3:
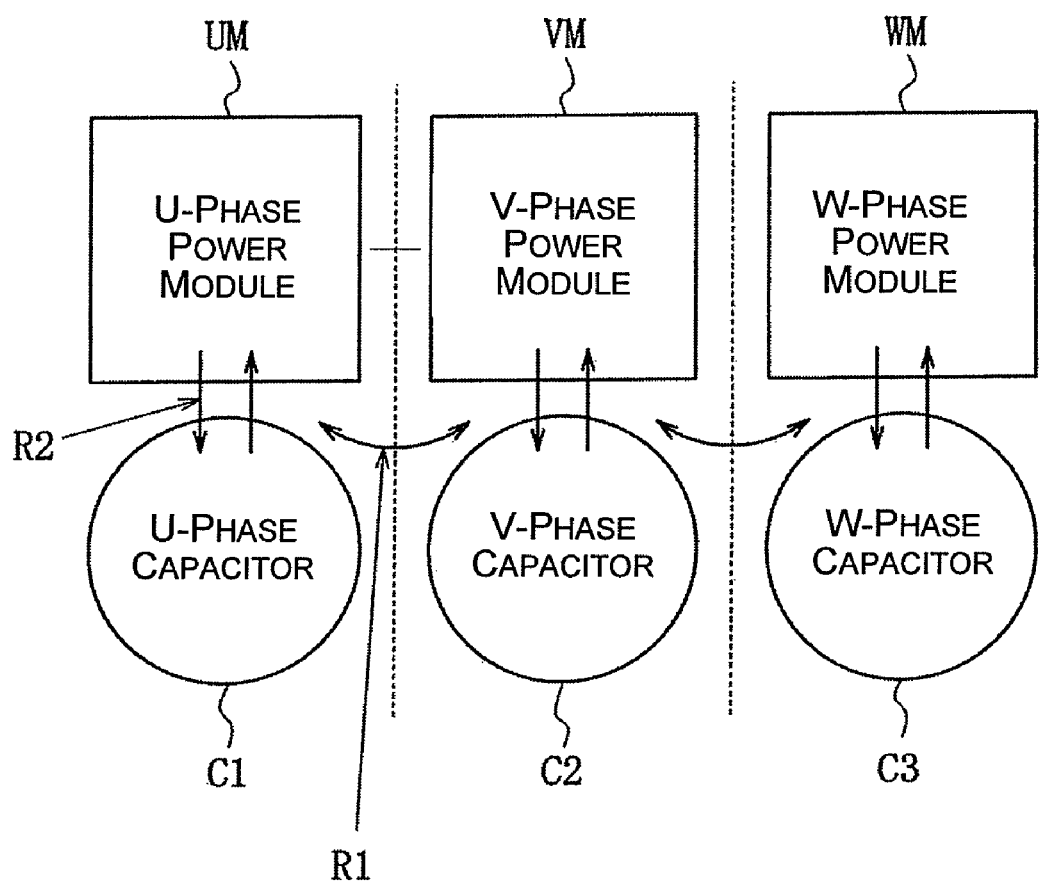
FIG. 3 is a simplified schematic diagram for explaining the relationships between the ripple currents and the surge currents produced in power modules and capacitors of a power conversion apparatus.
Figure 4:
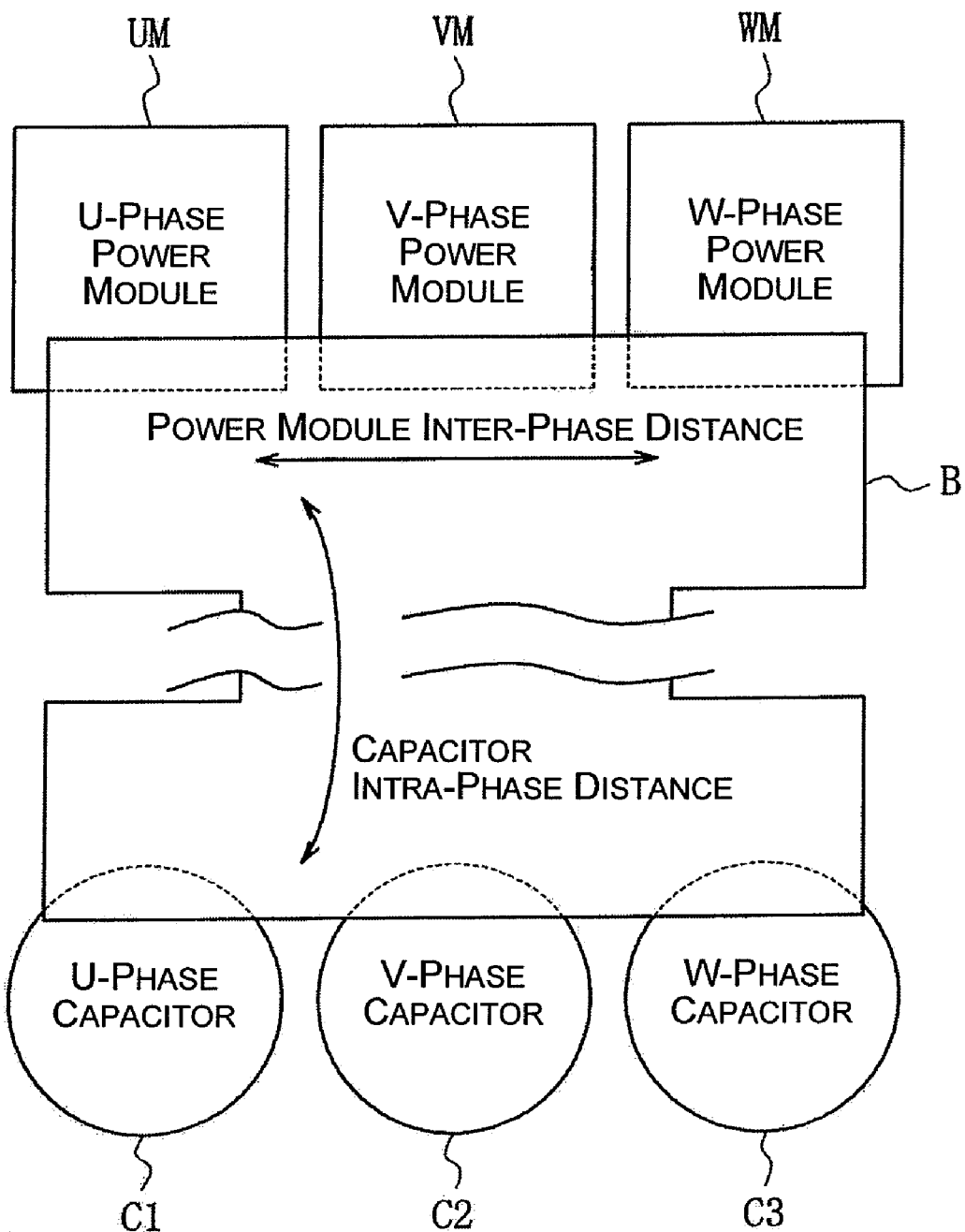
FIG. 4 is a simplified schematic diagram for explaining the relationships between the ripple currents and the surge currents produced in power modules and capacitors of a power conversion apparatus.

The behaviors of ripple currents and the surge currents in a power conversion apparatus will now be explained with reference to FIGS. 3 and 4. FIGS. 3 and 4 are simplified schematic diagrams for explaining the relationships of the ripple currents and the surge currents in the power conversion apparatus.

The ripple currents and the surge currents will be explained based on a three-phase inverter configuration having U-phase, V-phase, and W-phase power modules UM, VM and WM, and a plurality of capacitors C1, C2 and C3 as shown in FIG. 3. The switch operations of the U-phase, V-phase, and W-phase power modules UM, VM and WM cause the ripple currents and the surge currents to develop between the power modules UM, VM and WM and the capacitors C1, C2 and C3.

If the power modules UM, VM and WM of the three phases are electrically connected together by a bus bar, the ripple currents emanating from the power modules UM, VM and WM of the three phases will cancel one another out as indicated with the arrow R1 spanning left to right in the plane of the paper in FIG. 3. The remaining ripple current that does not get cancelled out flows to the capacitors C1, C2 and C3 as indicated with the arrow spanning vertically in the plane of the paper in FIG. 3. The capacitors C1, C2 and C3 do not have to be large-capacity capacitors so long as they are sufficient to absorb the remaining ripple current that is not cancelled out among the power modules UM, VM and WM.

By increasing the degree of canceling out of the ripple current between the three phases of the power modules UM, VM and WM and reducing the amount of ripple current that flows to the capacitors C1, C2, and C3, the capacity and size of the capacitors C1, C2, and C3 can be reduced. Therefore, the overall size of the inverter apparatus can be reduced.

In order to accomplish canceling out of the ripple current, the current flowing between the power modules UM, VM and WM (from one power module to another) needs to be increased in comparison with the currents flowing from the power modules UM, VM and WM to the capacitors C1, C2 and C3, respectively. In other words, the power modules UM, VM and WM should be connected to each other with lower impedance and the power modules UM, VM and WM should be respectively connected to the capacitors C1, C2 and C3 with higher impedance.

However, when the power modules UM, VM and WM are connected to the capacitors C1, C2 and C3 with a high impedance therebetween, the surface voltage accompanying a surge current increases, as shown in FIG. 4. Since the surge voltages seen by the capacitors C1, C2 and C3 increase in accordance with the impedance, the size of the capacitors C1, C2 and C3 is required to be larger when the impedance is increased.

In short, if the impedance between the power modules UM, VM and WM and the capacitors C1, C2 and C3 is increased more than necessary in order to accomplish canceling out of the ripple current among the power modules UM, VM and WM, then the size of the capacitors C1, C2 and C3 will have to be increased, which is contrary to the desired effect.

This kind of increase in the size of the capacitors is particularly marked when the power modules are bundled as a unit, the capacitors are bundled as a unit, and the power module unit and the capacitor unit are arranged separately.

When a plurality of typical capacitors is connected in parallel in order to increase the capacitance, the capacitors must be arranged such that the impedance between the power module and each of the capacitors is substantially uniform. Otherwise, the load will concentrate on the capacitors having a low impedance with respect to the power module and the life of those capacitors will be shortened. Thus, all of the impedances must be adjusted in accordance with the capacitor having the highest impedance. Therefore, the impedances between the power modules and the capacitors tend to become high.

In order to avoid the problem of the capacitors needing to be larger due to higher impedances, it is preferable to separate the capacitors and arrange them near the power modules. In other words, since the magnitudes of the surge currents and the ripple currents produced by the power modules are basically same for all of the power modules, the total capacitance does not change due to the separation of the capacitors. Furthermore, since the impedance between each of the capacitors and the corresponding power module can be set to an appropriately small value, the current that flows to the capacitors is smaller and the total capacitance is smaller than a case in which the capacitors are gathered together as a unit.

Thus, in the first embodiment of the present invention, by arranging the capacitors 5, 6 and 7 separately with respect to each of the power module 2, 3 and 4, it is not necessary to increase the distance between the power modules 2, 3 and 4 and the capacitors 5, 6 and 7 in order to make the intra-phase current paths from the power modules 2, 3 and 4 to the respective one of the capacitors 5, 6 and 7 uniform while variation of the service life does not occur among the capacitors 5, 6 and 7.

Accordingly, in the first embodiment of the present invention, the bus bar 8 shown in FIG. 2 is fabricated in such a shape that the impedance of the inter-phase current paths between the power modules 2, 3 and 4 is smaller than the impedance of the inter-phase current paths between each of the power modules 2, 3 and 4 and a corresponding one of the capacitors 5, 6 and 7.

For example, in the U-phase power module 2, the connection positions of the positive and negative electrode terminals are arranged such that the impedance of the inter-phase current path that electrically connects the positive electrode terminal and the negative electrode terminal of the U-phase power module 2 to the positive electrode terminal and the negative electrode terminal of the V-phase power module 3, respectively, is smaller than the impedance of the intra-phase current path 9 (FIG. 2) that electrically connects the positive electrode terminal and the negative electrode terminal of the U-phase power module 2 to the positive electrode terminal and the negative electrode terminal of the capacitor 5, respectively. Additionally, the connection positions of the positive and negative electrode terminals are arranged such that the impedance of the inter-phase current path that electrically connects the positive electrode terminal and the negative electrode terminal of the U-phase power module 2 to the positive electrode terminal and the negative electrode terminal of the W-phase power module 4, respectively, is smaller than the impedance of the intra-phase current path 9 (FIG. 2) that electrically connects the positive electrode terminal and the negative electrode terminal of the U-phase power module 2 to the positive electrode terminal and the negative electrode terminal of the capacitor 5, respectively.

With the first embodiment of the present invention, since the impedance of the inter-phase current paths between the power modules 2, 3 and 4 is smaller than the impedance of the intra-phase current path between the power module 2 and the capacitor 5, the degree to which the ripple currents are cancelled out between the U-phase power module 2 and the V-phase power module 3 and between the U-phase power module 2 and the W-phase power module 4 can be increased and the amount of the ripple current that flows to the capacitor 5 can be decreased. As a result, the size of the capacitor 5 can be reduced, and thus, the overall size of the power conversion apparatus 1 can be reduced. Additionally, since the capacitors 5, 6 and 7 are separated from one another as explained previously, it is not necessary for the distance between the power module 2 and the capacitor 5 within the U-phase to be long, and large surge currents can be prevented from flowing to the power module 2.

Similarly, in the V-phase power module 3, the impedance of the inter-phase current path that electrically connects the positive electrode terminal and the negative electrode terminal of the V-phase power module 3 to the positive electrode terminal and the negative electrode terminal of the U-phase power module 2, respectively, is smaller than the impedance of the intra-phase current path 10 (FIG. 2) that electrically connects the positive electrode terminal and the negative electrode terminal of the V-phase power module 3 to the positive electrode terminal and the negative electrode terminal of the capacitor 6, respectively. Additionally, the impedance of the inter-phase current path that electrically connects the positive electrode terminal and the negative electrode terminal of the V-phase power module 3 to the positive electrode terminal and the negative electrode terminal of the W-phase power module 4, respectively, is smaller than the impedance of the intra-phase current path 10 (FIG. 2) that electrically connects the positive electrode terminal and the negative electrode terminal of the V-phase power module 3 to the positive electrode terminal and the negative electrode terminal of the capacitor 6, respectively.

With the first embodiment of the present invention, since the impedance of the inter-phase current paths between the power modules 2, 3 and 4 is smaller than the impedance of the intra-phase current paths between the power module 3 and the capacitor 6, the degree to which the ripple currents are cancelled out between the V-phase power module 3 and the U-phase power module 2 and between the V-phase power module 3 and the W-phase power module 4 can be increased and the amount of the ripple current that flows to the capacitor 6 can be decreased. As a result, the size of the capacitor 6 can be reduced, and thus, the overall size of the power conversion apparatus 1 can be reduced. Additionally, it is not necessary for the distance between the power module 3 and the capacitor 6 within the V-phase to be long, and large surge currents can be prevented from flowing to the power module 3.

Similarly, in the W-phase power module 4, the impedance of the inter-phase current path that electrically connects the positive electrode terminal and the negative electrode terminal of the W-phase power module 4 to the positive electrode terminal and the negative electrode terminal of the U-phase power module 2, respectively, is smaller than the impedance of the intra-phase current path 11 (FIG. 2) that electrically connects the positive electrode terminal and the negative electrode terminal of the W-phase power module 4 to the positive electrode terminal and the negative electrode terminal of the capacitor 7, respectively. Additionally, the impedance of the inter-phase current path that electrically connects the positive electrode terminal and the negative electrode terminal of the W-phase power module 4 to the positive electrode terminal and the negative electrode terminal of the V-phase power module 3, respectively is smaller than the impedance of the intra-phase current path 11 (FIG. 2) that electrically connects the positive electrode terminal and the negative electrode terminal of the W-phase power module 4 to the positive electrode terminal and the negative electrode terminal of the capacitor 7, respectively.

With the first embodiment of the present invention, since the impedance of the inter-phase current paths between the power modules 2, 3 and 4 is smaller than the impedance of the intra-phase current paths between the power module 4 and the capacitor 7, the degree to which the ripple currents are cancelled out between the W-phase power module 4 and the U-phase power module 2 and between the W-phase power module 4 and the V-phase power module 3 can be increased and the amount of the ripple current that flows to the capacitor 7 can be decreased. As a result, the size of the capacitor 7 can be reduced, and thus, the overall size of the power conversion apparatus 1 can be reduced. Additionally, since the capacitors 5, 6 and 7 are separated from one another as explained previously, it is not necessary for the distance between the power module 4 and the capacitor 7 within the W-phase to be long, and large surge currents can be prevented from flowing to the power module 4.

In any one of the power modules 2, 3 and 4, it is preferable for the impedance of the inter-phase current path that electrically connects the positive and negative electrode terminals of the power module 2, 3 or 4 corresponding to one of the phases to the positive and negative electrode terminals of the power module 2, 3 or 4 corresponding to another of the phases to be smaller than the sum of the impedance of the intra-phase current path that electrically connects the positive and negative electrode terminals of the power module 2, 3 or 4 corresponding to the one of the phases to the positive and negative terminals of the capacitor 5, 6 or 7 of the same phase and the internal impedance of the same capacitor 5, 6 or 7.

More specifically, taking the U-phase as a representative example, the impedance of the inter-phase current path that electrically connects the positive electrode terminal and the negative electrode terminal of the U-phase power module 2 to the positive electrode terminal and the negative electrode terminal of the V-phase power module 3, respectively, is smaller than the sum of the impedance of the intra-phase current path 9 (FIG. 2) and the internal impedance of the capacitor 5 of the U-phase. Similarly, the impedance of the inter-phase current path that electrically connects the positive electrode terminal and the negative electrode terminal of the U-phase power module 2 to the positive electrode terminal and the negative electrode terminal of the W-phase power module 4, respectively, is smaller than the sum of the impedance of the intra-phase current path 9 (FIG. 2) and the internal impedance of the capacitor 5 of the U-phase.

By making the total impedance including the internal impedance of the capacitor 5 small, the impedance of the intra-phase current path 9 formed by the bus bar 8 is prevented from being set unnecessarily large, and the surge voltage can be decreased. As a result, the size of the capacitor 5 can be reduced even further. Therefore, the overall size of the power conversion apparatus 1 can be reduced further.

It is further preferred that the impedance of the intra-phase current path 9 (FIG. 2) of the U-phase, the impedance of the intra-phase current path 10 (FIG. 2) of the V-phase, and the impedance of the intra-phase current path 11 (FIG. 2) of the W-phase be equal to one another so that the impedance of these intra-phase current paths be identical for each phase. Making the intra-phase current path impedances to be equal to one another prevents fluctuations of the surge voltage, prevents variation in the service lives of the capacitors 5, 6 and 7, and makes it possible to convert the electric power in a stable manner.

It is further preferred that the positive and negative terminals of the power modules 2, 3 and 4 be substantially arranged on imaginary circles $A_P$ and $A_N$ (examples of first imaginary circles, or first and second imaginary circles), respectively, as indicated with double-dot chain lines in FIG. 2 in order to reduce the impedance of the inter-phase current path electrically connecting the positive and negative electrode terminals of the U-phase power module 2 to the positive and negative electrode terminals of the V-phase power module 3, the impedance of the inter-phase current path electrically connecting the positive and negative electrode terminals of the V-phase power module 3 to the positive and negative electrode terminals of the W-phase power module 4, and the impedance of the inter-phase current path electrically connecting the positive and negative electrode terminals of the W-phase power module 4 to the positive and negative electrode terminals of the U-phase power module 2.

As described previously, if the impedances of the intra-phase current paths are set to be higher than the impedances of the inter-phase current paths between the power modules 2, 3 and 4 or if the impedances of the intra-phase current paths are simply set to be large, then the surge currents and the ripple currents will increase and the loads imposed on the capacitors will increase.

Instead, it is preferable to make the impedances of the intra-phase current paths larger than the impedances of the inter-phase current paths between the power modules 2, 3 and 4 by making the impedances of the inter-phase current paths small.

In order to reduce the impedances of the inter-phase current paths between the power modules 2, 3 and 4, it is possible to simply arrange the power modules 2, 3 and 4 such that the inter-phase current paths between adjacent power modules 2, 3 and 4 are short, as shown, for example, in FIG. 4. However, in the arrangement shown in FIG. 4, the inter-phase current path between the U-phase power module UM and the W-phase power module WM is comparatively long and the impedance thereof is large.

Instead, by arranging the positive electrode terminals of the power modules on the imaginary circle $A_P$ as shown with a double-dot chain line in FIG. 2, the distance between the positive and negative electrode terminals of the U-phase power module 2 and the positive and negative electrode terminals of the W-phase power module 4 can be shortened. As a result, the impedance of the intra-phase current path can also be reduced.

In the example shown in FIG. 2, the positive electrode terminal and the negative electrode terminal of each of the power modules 2, 3 and 4 are arranged closely adjacent to each other. This is because there are inter-phase current paths between both the positive electrode terminals and the negative electrode terminals of the power modules 2, 3 and 4. The same design requirements apply to both the inter-phase current paths between the positive electrode terminals and the inter-phase current paths between the negative electrode terminals. In other words, when the inter-phase current paths are designed to minimize the impedances thereof, the positive electrode terminal and the negative electrode terminal of each of the power module 2, 3 or 4 inherently need to be arranged close to each other.

Thus, in the first embodiment of the present invention, the positive electrode terminal and the negative electrode terminal of each of the power modules 2, 3 and 4 are preferably arranged close to each other on one end surface of each of the power modules 2, 3 and 4. Then, the end surface of each of the power modules 2, 3 and 4 provided with the positive electrode terminal and the negative electrode terminal are arranged to face towards inside of the imaginary circles $A_P$ and $A_N$ as shown in FIG. 2.

In order to make the impedance of the inter-phase current path between the power modules 2, 3 and 4 the same for each of the phases, it is preferable to arrange the positive electrode terminal of each of the power modules 2, 3 and 4 substantially on the imaginary circle $A_P$ as indicated with the double-dot chain line in FIG. 2. It is also preferable to arrange the negative electrode terminal of each of the power modules 2, 3 and 4 on the imaginary circle $A_N$ as indicated with the double-dot chain line in FIG. 2.

Although the positive electrode terminals of the power modules 2, 3 and 4 and the negative electrode terminals of the power modules 2, 3 and 4 are illustrated as being disposed on separate imaginary circles $A_P$ and $A_N$ in the configuration shown in FIG. 2, it will be apparent to those skilled in the art from this disclosure that all of the positive electrode terminals and the negative electrode terminals of the power modules 2, 3 and 4 can be arranged to be disposed on a single imaginary circle.

Accordingly, with the first embodiment of the present invention, the impedance of the inter-phase current path electrically connecting between the power module 2, 3 or 4 of one phase and the power module 2, 3 or 4 of another phase is smaller than the impedance of the intra-phase current path electrically connecting between any power module 2, 3 or 4 and capacitor 5, 6 or 7 corresponding to the same phase. Thus, the degree to which the ripple currents of the different phases cancel one another out can be increased and the ripple current flowing to the capacitors 5, 6 and 7 can be reduced.

As a result, the size of the capacitors 5, 6 and 7 can be reduced and the overall size of the power conversion apparatus 1 can be reduced. Also, since each of the capacitors 5, 6 and 7 is arranged close to the corresponding power module 2, 3 or 4, the connections between the capacitors 5, 6 and 7 and the power modules 2, 3 and 4 have relatively low impedance and the surge current can be reduced in advance. Therefore, the size of the capacitors 5, 6 and 7 can be reduced even further.

Second Embodiment

Figure 5A:
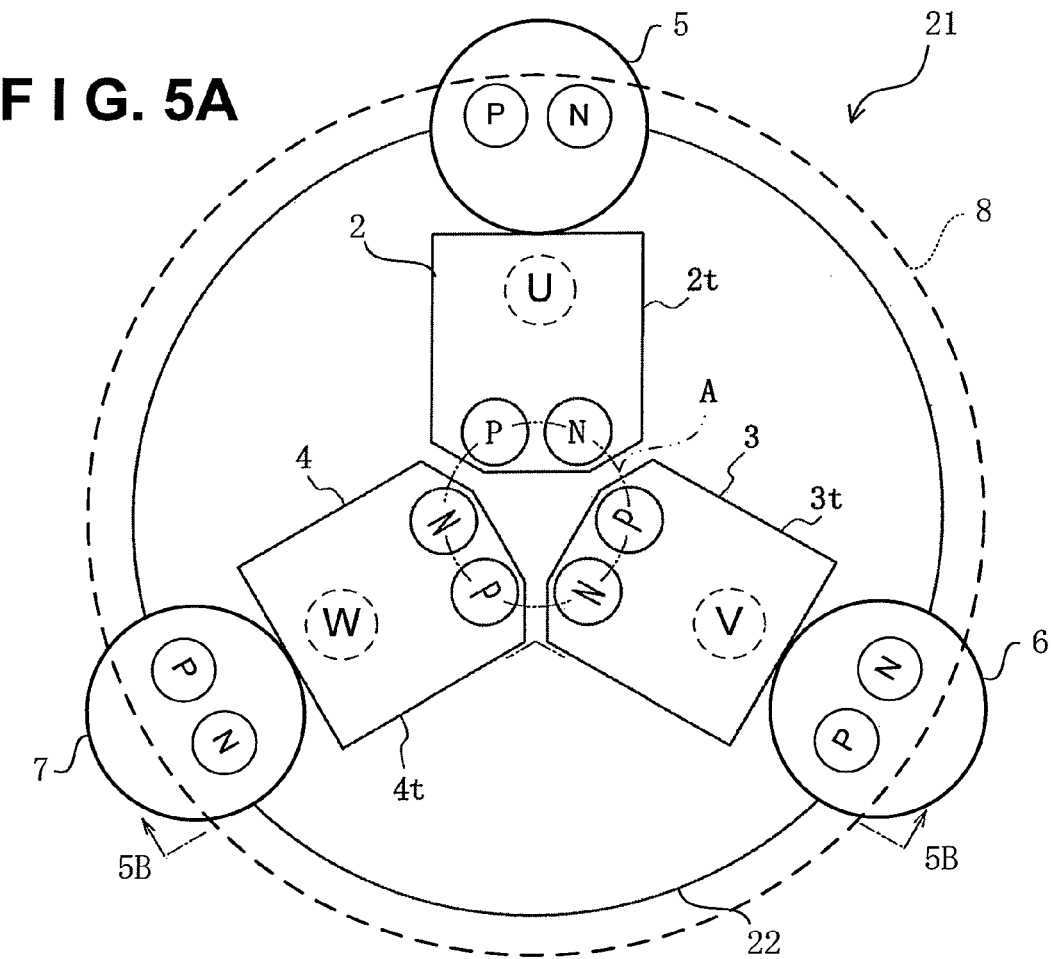
FIG. 5A is a schematic plan view illustrating an arrangement of power modules of a power conversion apparatus in accordance with a second embodiment of the present invention.
Figure 5B:
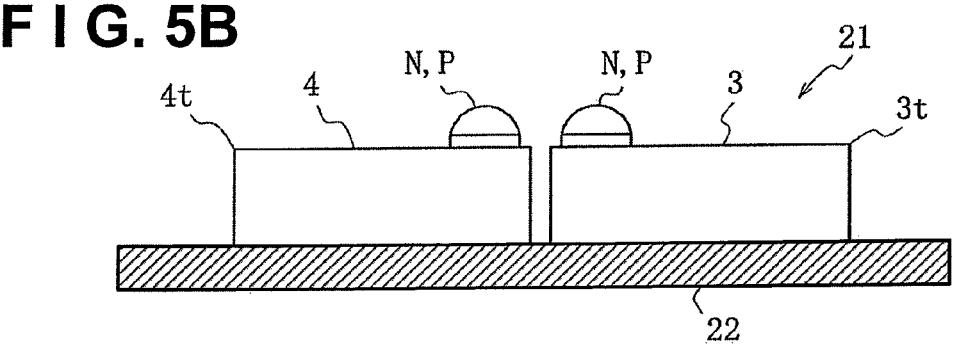
FIG. 5B is a partial schematic projected cross sectional view of the power conversion apparatus in accordance with the second embodiment of the present invention as taken along a section line 5B-5B of FIG. 5A.

Referring now to FIGS. 5A and 5B, a power conversion apparatus 21 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 5A is a schematic plan view of the power conversion apparatus 21 according to the second embodiment of the present invention. FIG. 5B is a simplified partial cross sectional view of the power conversion apparatus 21 as taken along a section line 5B-5B of FIG. 5A in which the capacitors 5, 6 and 7 are omitted for the sake of brevity. The explanation will focus chiefly on the constituent features of the second embodiment that are different from the first embodiment.

In the second embodiment, the power modules 2, 3 and 4 are arranged in a generally circular fashion on a cooling device 22. In other words, the power modules 2, 3 and 4 are arranged on a common imaginary circle A. The positive (P) and negative (N) electrode terminals of the power modules 2, 3 and 4 are arranged on the end portions of the power modules 2, 3 and 4 that face an inner side of the imaginary circle A.

Moreover, the capacitors 5, 6 and 7 are arranged radially outwardly of the power modules 2, 3 and 4 as shown in FIG. 5A. The positive and negative electrode terminals of the power modules 2, 3 and 4 indicated with P's and N's in FIG. 5A are respectively electrically connected with the positive and negative electrode terminals of the respective capacitors 5, 6 and 7 via a bus bar 8 as described in the first embodiment. In the second embodiment, all of the positive and negative electrode terminals of the power modules 2, 3 and 4 are arranged on the imaginary circle A (first imaginary circle) indicated with a double-dot chain line with equal spacing in the circumferential direction as shown in FIG. 5A.

As shown in FIGS. 5A and 5B, the positive electrode terminal and the negative electrode terminal of each of the power modules 2, 3 and 4, is provided on one end portion of the power modules 2, 3 and 4 that face the inner side of the imaginary circle A. The positive and negative electrode terminals are arranged on the same imaginary circle A, as indicated with the double-dot chain line in FIG. 5A. Moreover, as shown in FIGS. 5A and 5B, other end portions 2t, 3t, and 4t of the power modules 2, 3 and 4, on which the positive and negative electrode terminals are not provided, are arranged outside the imaginary circle A indicated with the double-dot chain line. As a result, the distances between the positive and negative end terminals of different phases are short and the impedances of the inter-phase current paths between the power modules 2, 3 and 4 can be made small.

Although not shown in FIGS. 5A and 5B, a plurality of capacitors are provided in the power conversion apparatus 21 of the second embodiment so that at least one capacitor is connected to a corresponding one of the power modules 2, 3 and 4 as explained in the first embodiment above.

Third Embodiment

Figure 6A:
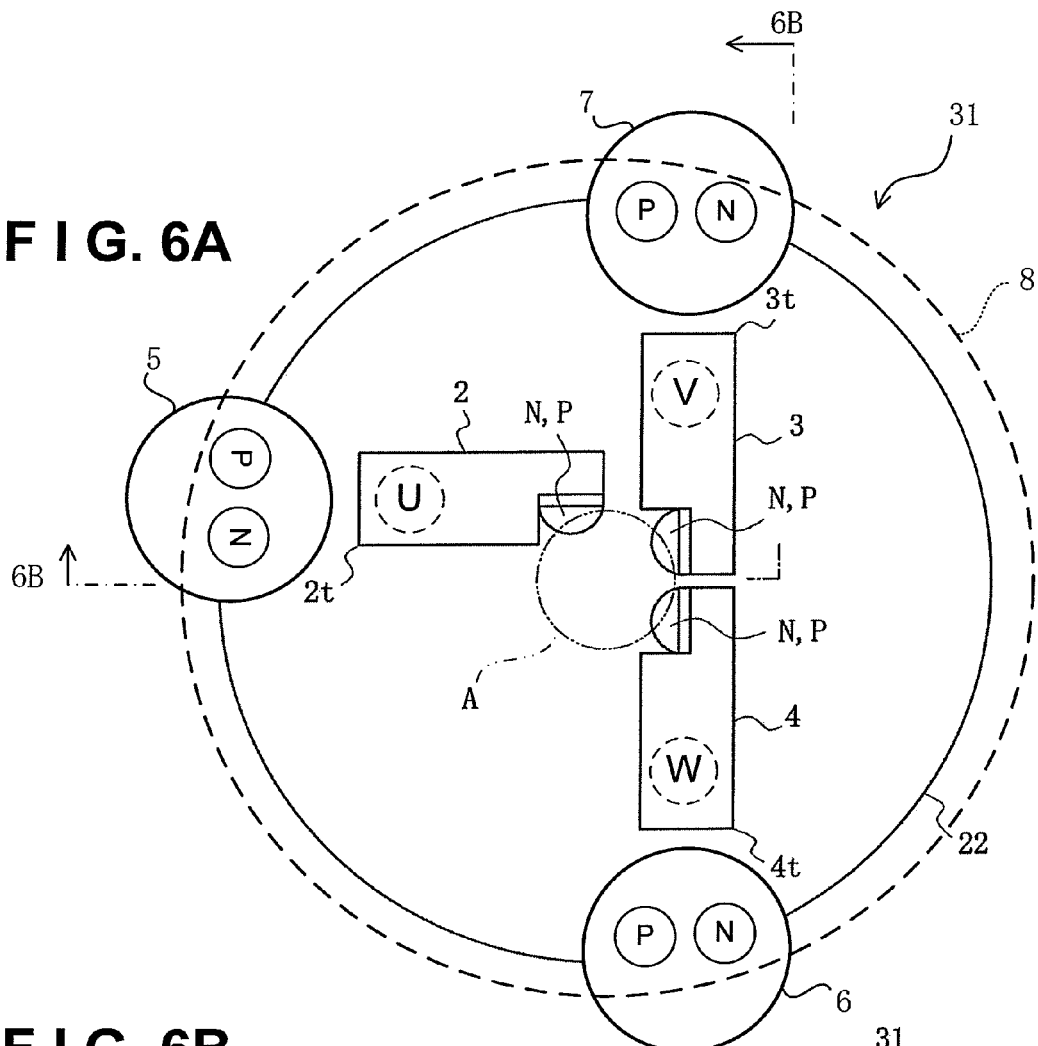
FIG. 6A is a schematic plan view illustrating an arrangement of power modules of a power conversion apparatus in accordance with a third embodiment of the present invention.
Figure 6B:
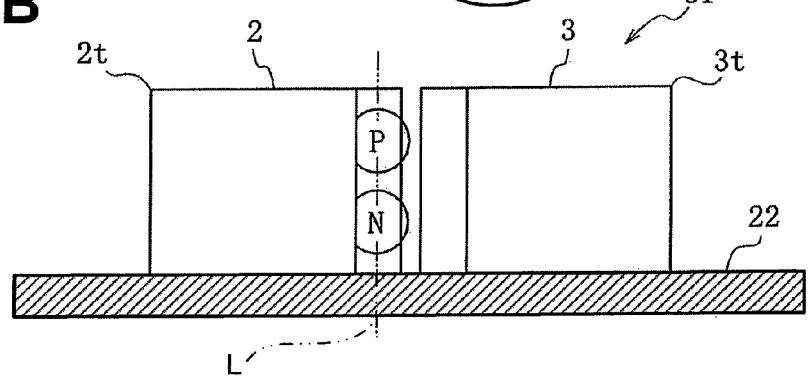
FIG. 6B is a partial schematic cross sectional view of the power conversion apparatus in accordance with the third embodiment of the present invention as taken along a section line 6B-6B of FIG. 6A.

Referring now to FIGS. 6A and 6B, a power conversion apparatus 31 in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

FIG. 6A is a schematic plan view of the power conversion apparatus 31 according to the third embodiment of the present invention. FIG. 6B is a simplified partial cross sectional view of the power conversion apparatus 31 as taken along a section line 6B-6B of FIG. 6A in which the capacitors 5, 6 and 7 are omitted for the sake of brevity. The explanation will focus chiefly on the constituent features of the third embodiment that are different from the first or second embodiment.

In the third embodiment of the present invention, all of the positive electrode terminals of the power modules 2, 3 and 4 are arranged on the imaginary circle A indicated with a double-dot chain line shown in FIG. 6A. Additionally, all of the negative electrode terminals of the power modules 2, 3 and 4 are also arranged on the imaginary circle A indicated with the double-dot chain line shown in FIG. 6A. As shown in FIG. 6A, the capacitors 5, 6 and 7 are arranged radially outwardly of the power modules 2, 3 and 5. The positive and negative electrode terminals of the power modules 2, 3 and 4 indicated with P's and N's in FIG. 6A are respectively electrically connected with the positive and negative electrode terminals of the respective capacitors 5, 6 and 7 via a bus bar 8.

The third embodiment shown in FIGS. 6A and 6B will now be explained by comparing to the second embodiment shown in FIG. 5. In FIG. 6B, an imaginary line L is shown joining the positive electrode terminal and the negative electrode terminal of the power module 2. The power module 2 is arranged on the cooling device 22 such that the imaginary line L is perpendicular to the imaginary circle A shown in FIG. 6A. The other power modules 3 and 4 are arranged in the same manner as the power module 2. As a result, the distances between the positive and negative electrode terminals of different phases are even shorter and the impedances of the inter-phase current paths between the power modules can 2, 3 and 4 be made even smaller.

Although not shown in FIGS. 6A and 6B, a plurality of capacitors are provided in the power conversion apparatus 31 of the third embodiment so that at least one capacitor is connected to a corresponding one of the power modules 2, 3 and 4 as explained in the first embodiment above.

Fourth Embodiment

Figure 7A:
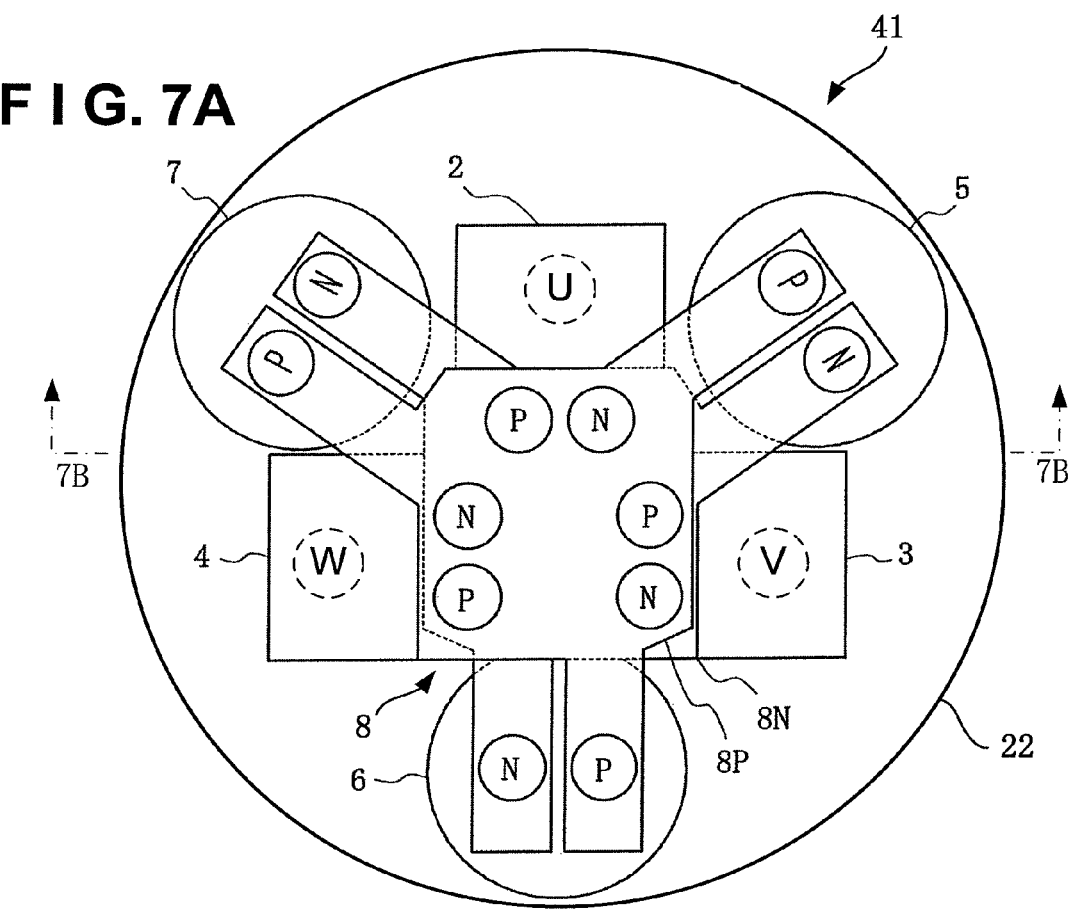
FIG. 7A is a schematic plan view illustrating an arrangement of power modules and capacitors of a power conversion apparatus in accordance with a fourth embodiment of the present invention.
Figure 7B:
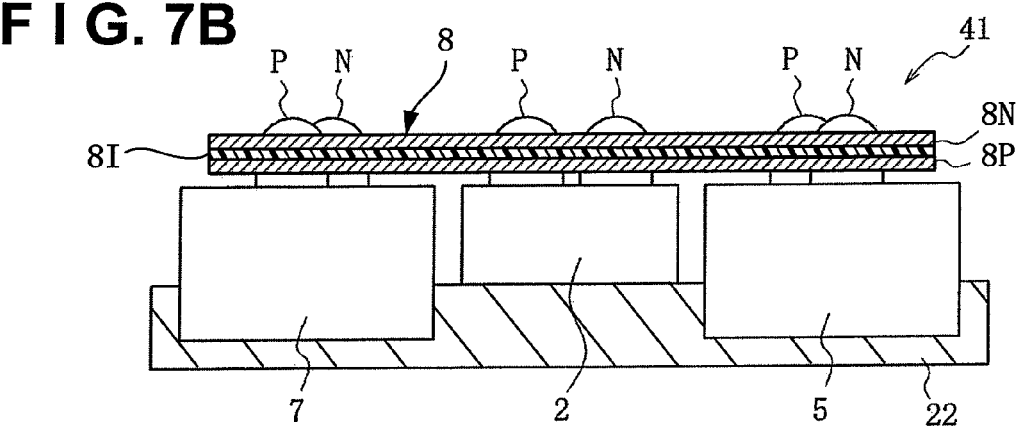
FIG. 7B is a schematic cross sectional view of the power conversion apparatus in accordance with the fourth embodiment of the present invention as taken along a section line 7B-7B of FIG. 7A.
Figure 8:
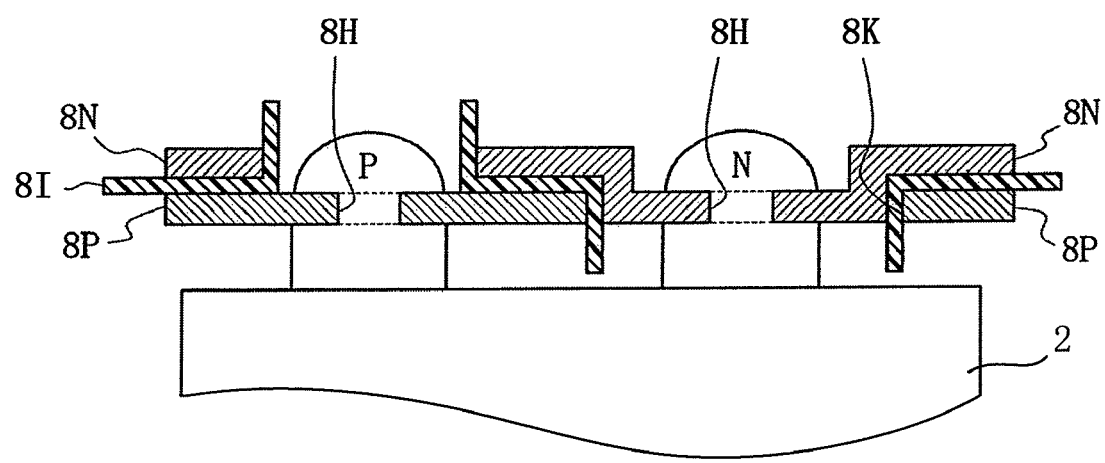
FIG. 8 is an enlarged cross sectional view of a portion where a bus bar connects to terminals of the power module of the power conversion apparatus in accordance with the fourth embodiment of the present invention.

Referring now to FIGS. 7A, 7B and 8, a power conversion apparatus 41 in accordance with a fourth embodiment will now be explained. In view of the similarity between the first through fourth embodiments, the parts of the fourth embodiment that are identical to the parts of the first, second or third embodiment will be given the same reference numerals as the parts of the first, second or third embodiment. Moreover, the descriptions of the parts of the fourth embodiment that are identical to the parts of the first, second or third embodiment may be omitted for the sake of brevity.

FIG. 7A is a schematic plan view of the power conversion apparatus 41 according to the fourth embodiment of the present invention. FIG. 7B is a simplified cross sectional view of the power conversion apparatus 41 as taken along a section line 7B-7B of FIG. 7A. The explanation will focus chiefly on the constituent features of the fourth embodiment that are different from the previous embodiments.

In FIGS. 7A and 7B illustrates an arrangement of a bus bar 8 in more detail. In the fourth embodiment, the bus bar 8 includes a thin plate-shaped bus bar portion 8P configured and arranged to electrically connect the positive electrode terminals of the power modules 2, 3 and 4 and the capacitors 5, 6 and 7, a thin plate-shaped bus bar portion 8N configured and arranged to electrically connect the negative electrode terminals of the same, and an insulator 81 onto which the bus bar portions 8P and 8N are affixed.

As shown in FIG. 7A, the positive and negative electrode terminals of the power modules 2, 3 and 4 are arranged in a middle portion of the power conversion apparatus 41. On the other hand, the positive and negative electrode terminals of the capacitors 5, 6 and 7 are arranged on the outside perimeter of the power conversion apparatus 41. Therefore, the distances between the respective positive and negative electrode terminals of the power modules 2, 3 and 4 are shorter than the distances between the positive and negative electrode terminals of the power modules 2, 3 and 4 and the positive and negative electrode terminals of the capacitors 5, 6 and 7, respectively. As a result, the impedances of the inter-phase current paths between the power modules 2, 3 and 4 can be made smaller than the impedances of the intra-phase current paths.

FIG. 8 is an enlarged vertical cross sectional view of the portion where the bus bar 8 shown in FIG. 7B connects to the positive and negative electrode terminals of the power module 2. As shown in FIG. 8, the bus bar 8 is connected to the positive and negative electrode terminals disposed in an upper portion of the power module 2. The bus bar portion 8P for the positive electrode terminals is arranged on the bottom side of the bus bar 8 and the bus bar portion 8N for the negative electrode terminals is arranged on the top side of the bus bar 8. The insulation layer 8I is disposed between the bus bar portions 8P and 8N. Thus, the plate-shaped bus bar 8 is fabricated by attaching the bus bar portion 8P, the bus bar portion 8N, and the insulation layer 8I to one another so as to form an integral unit.

As shown in FIG. 8, the part of the bus bar portion 8N that connect to the negative electrode terminal are formed to be a step section that is lower than other parts of the bus bar portion 8N, i.e., at the same height as the bus bar portion 8P. Consequently, as shown in FIG. 8, a notch portion 8K is provided at the part of the bus bar portion 8P where the negative electrode terminal is connected. On the other hand, a pair of holes 8H is provided at the part of the bus bar portion 8P where the positive electrode terminal is connected and at the part of the bus bar portion 8N where the negative electrode terminal is connected. The positive electrode terminal is passed through the hole 8H of the bus bar portion 8P and the connection is secured with a bolt or other fixing arrangement. Similarly, the negative electrode terminal is passed through the hole 8H of the bus bar portion 8N and the connection is secured with a bolt or other fixing arrangement.

The bus bar portion 8P and the bus bar portion 8N of the bus bar 8 are connected to the positive and negative electrode terminals, respectively, of the power modules 3 and 4 and the capacitors 5, 6 and 7 in the similar manner as shown in FIG. 8.

Fifth Embodiment

Referring now to FIGS. 9A and 9B, a power conversion apparatus 51 in accordance with a fifth embodiment will now be explained. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity. The parts of the fifth embodiment that differ from the parts of the previous embodiments will be indicated with a single prime (').

FIG. 9A is a schematic plan view of the power conversion apparatus 51 according to the fifth embodiment of the present invention. FIG. 9B is a simplified cross sectional view of the power conversion apparatus 51 as taken along a section line 9B-9B of FIG. 9A. The explanation will focus chiefly on the constituent features of the fifth embodiment that are different from the previous embodiments.

As shown in FIGS. 9A and 9B, in the fifth embodiment of the present invention, a bus bar 8' is circular in shape. The form (shape) of the bus bar 8' in the places where a bus bar portion 8P' and a bus bar portion 8N' of the bus bar 8' connect to the positive and negative electrode terminals of the power modules 2, 3 and 4 and the capacitors 5, 6 and 7 is the same as shown in FIG. 8.

Sixth Embodiment

Referring now to FIGS. 10A and 10B, a power conversion apparatus 61 in accordance with a sixth embodiment will now be explained. In view of the similarity between the fifth and sixth embodiments, the parts of the sixth embodiment that are identical to the parts of the fifth embodiment will be given the same reference numerals as the parts of the second, fourth or fifth embodiment. Moreover, the descriptions of the parts of the sixth embodiment that are identical to the parts of the previous embodiments may be omitted for the sake of brevity.

FIG. 10A is a schematic plan view of the power conversion apparatus 61 according to the sixth embodiment of the present invention. FIG. 10B is a simplified cross sectional view of the power conversion apparatus 61 as taken along a section line 10B-10B of FIG. 10A. The explanation will focus chiefly on the constituent features of the sixth embodiment that are different from the previous embodiments.

As shown in FIGS. 10A and 10B, in the sixth embodiment, the bus bar 8' is circular in shape similarly to the fifth embodiment illustrated in FIGS. 9A and 9B. In addition, in the sixth embodiment, both the positive electrode terminal and the negative electrode terminal of each of the power modules 2, 3 and 4 are arranged on an imaginary circle A indicated with a double-dot chain line shown in FIG. 10A. The pairs of the positive and negative electrode terminals of the power modules 2, 3 and 4 are arranged with equal spacing in the circumferential direction of the imaginary circle A. In this way, the impedances of the inter-phase current paths between the power modules 2, 3 and 4 can be made identical for all phases.

In the sixth embodiment, both the positive electrode terminal and the negative electrode terminal of each of the capacitors 5, 6 and 7 are arranged on an imaginary circle B (second imaginary circle) indicated with a double-dot chain line shown in FIG. 10A. The pairs of the positive and negative terminals of the capacitors 5, 6 and 7 are arranged with equal spacing in the circumferential direction of the imaginary circle B. In this way, the impedances of the intra-phase current paths of all phases can be made the same.

By forming the bus bar 8' such that it is symmetrical about the center point of the circular power conversion apparatus 61, the impedances of the inter-phase current paths between power modules can be made identical for all phases and the intra-phase current paths can be made identical for all phases.

As shown in FIG. 10A, the diameter of the imaginary circle A is smaller than one half of the diameter of the second imaginary circle B (more precisely, the diameter of the imaginary circle A is smaller than the distance between the imaginary circle A and the imaginary circle B). As a result, the impedances of the inter-phase current paths between the power modules 2, 3 and 4 can be made smaller than the impedances of the intra-phase current paths.

In the sixth embodiment shown in FIGS. 10A and 10B, the form (shape) of the bus bar 8' in the places where the bus bar portion 8P and the bus bar portion 8N connect to the positive and negative electrode terminals of the power modules 2, 3 and 4 and the capacitors 5, 6 and 7 is the same as shown in FIG. 8.

Seventh Embodiment

Figure 11:
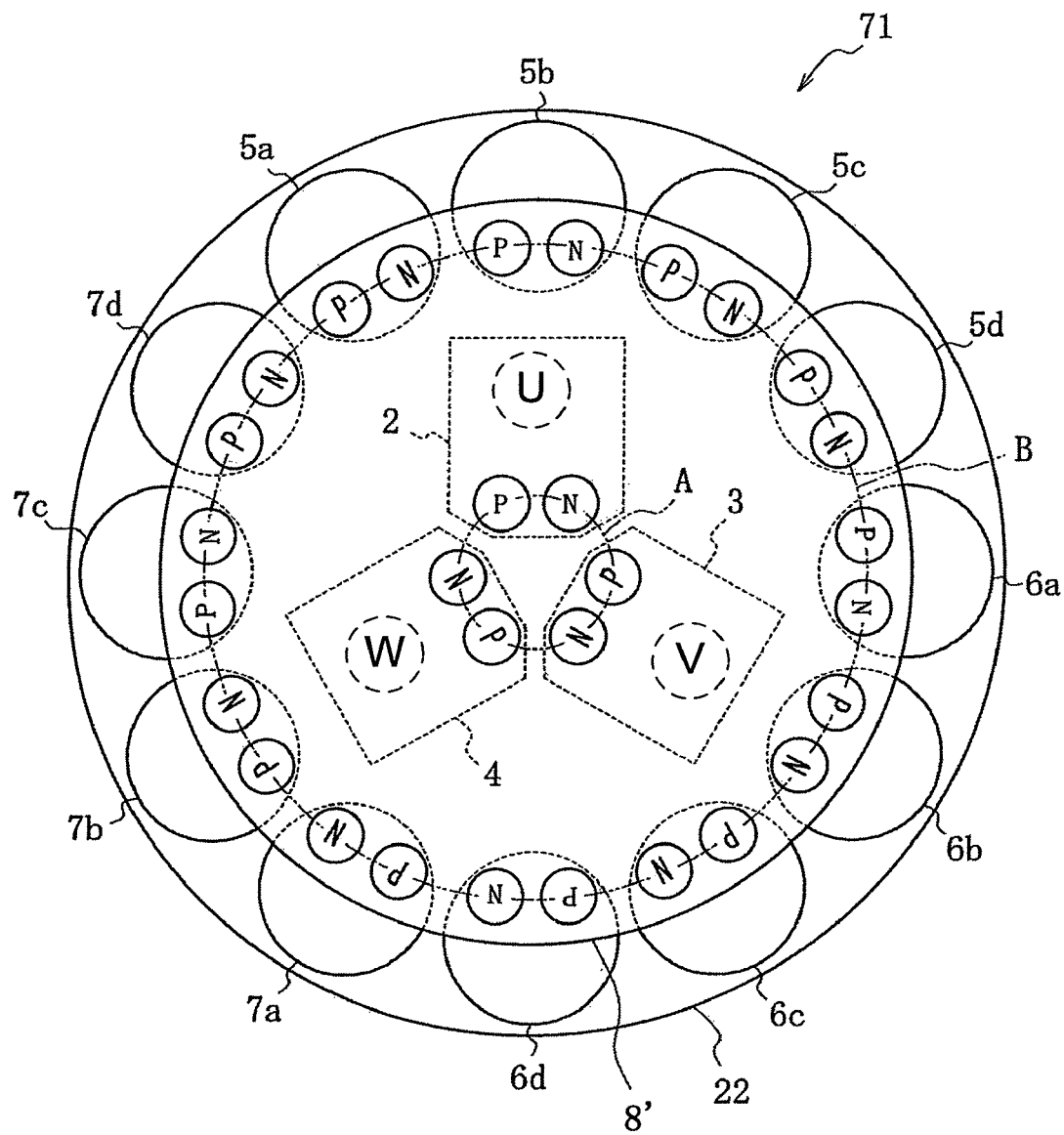
FIG. 11 is a schematic plan view illustrating an arrangement of power modules and capacitors of a power conversion apparatus in accordance with a seventh embodiment of the present invention.

Referring now to FIG. 11, a power conversion apparatus 71 in accordance with a seventh embodiment will now be explained. In view of the similarity between the sixth and seventh embodiments, the parts of the seventh embodiment that are identical to the parts of the sixth embodiment will be given the same reference numerals as the parts of the first embodiment. Moreover, the descriptions of the parts of the seventh embodiment that are identical to the parts of the sixth embodiment may be omitted for the sake of brevity.

FIG. 11 is a schematic plan view of the power conversion apparatus 71 according to the sixth embodiment of the present invention. The explanation will focus chiefly on the constituent features of the seventh embodiment that are different from the previous embodiments.

The power conversion apparatus 71 of the seventh embodiment is the same as the power conversion apparatus 61 of the sixth embodiment shown in FIGS. 10A and 10B except that each of the capacitors 5, 6 and 7 in the sixth embodiment has been divided into a plurality of capacitors 5a-5d, 6a-6d and 7a-7d. Thus, the U-phase power module 2 is connected to the capacitors 5a, 5b, 5c and 5d. Similarly, the V-phase power module 3 is connected to the capacitors 6a, 6b, 6c and 6d. The W-phase power module 4 is connected to the capacitors 7a, 7b, 7c and 7d. The configurations of the capacitors 5a-5d, 6a-6d and 7a-7d are preferably all the same.

A capacitor group including the capacitors 5a, 5b, 5c and 5d in the seventh embodiment, which corresponds to the capacitor 5 of the sixth embodiment, will now be explained as a representative example. The capacitors 5a, 5b, 5c, and 5d can be connected in parallel, series, or a combination of parallel and series.

The power conversion apparatus 71 is arranged such that the impedance of the inter-phase current path between the U-phase and V-phase power modules 2 and 3 is smaller than the impedance of the intra-phase current path electrically connecting the U-phase power module 2 to the capacitor group including the capacitors 5a, 5b, 5c and 5d. Additionally, the power conversion apparatus 71 is arranged such that the impedance of the inter-phase current path between the U-phase and W-phase power modules is smaller than the impedance of the intra-phase current path electrically connecting the U-phase power module 2 to the capacitor group including the capacitors 5a, 5b, 5c and 5d.

As shown in FIG. 11, the positive and negative electrode terminals of the capacitors 5a-5d, 6a-6d and 7a-7d are preferably arranged on the imaginary circle B.

Eighth Embodiment

Figure 12:
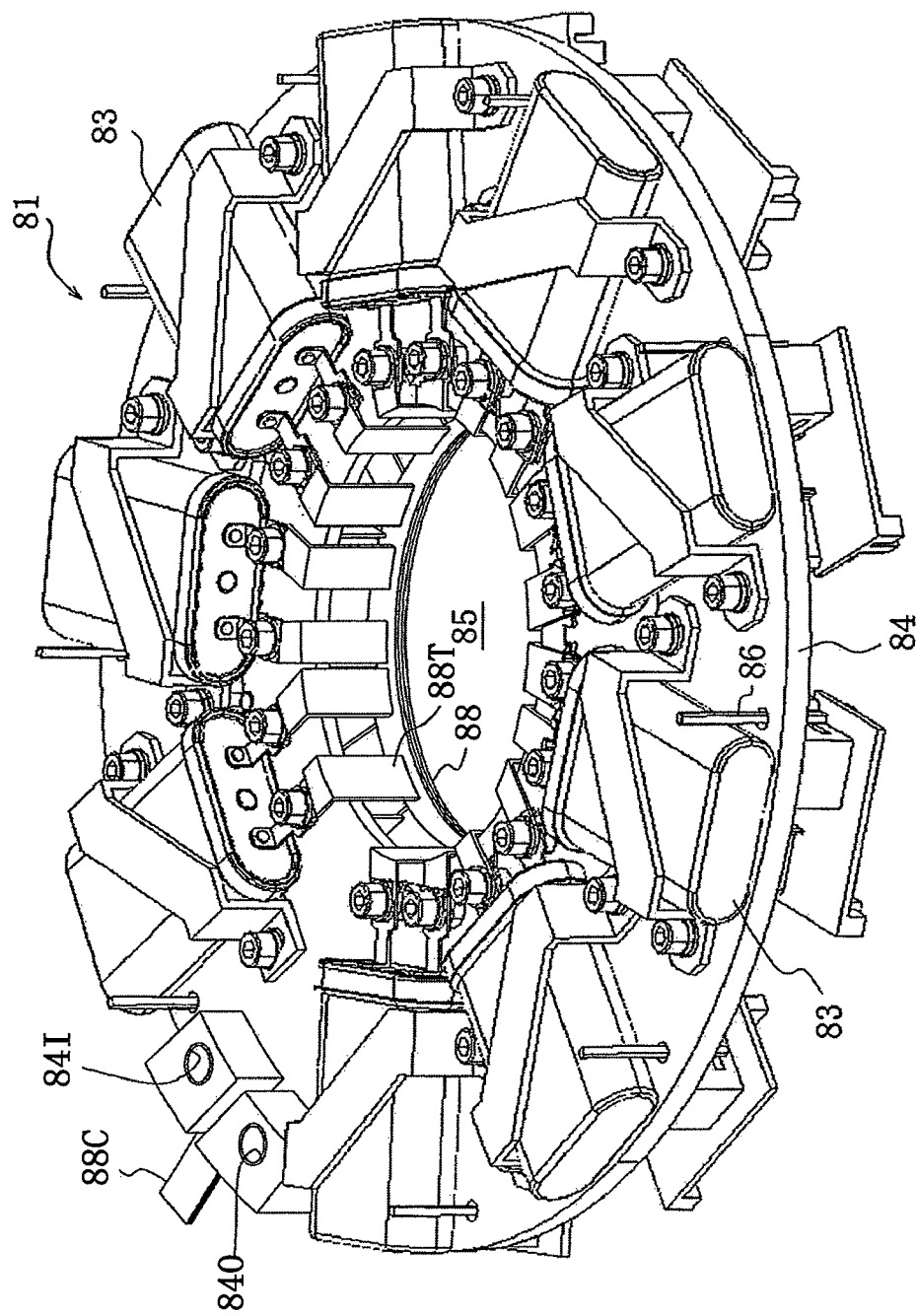
FIG. 12 is a perspective view of one side of a power conversion apparatus in accordance with an eighth embodiment of the present invention.
Figure 13:
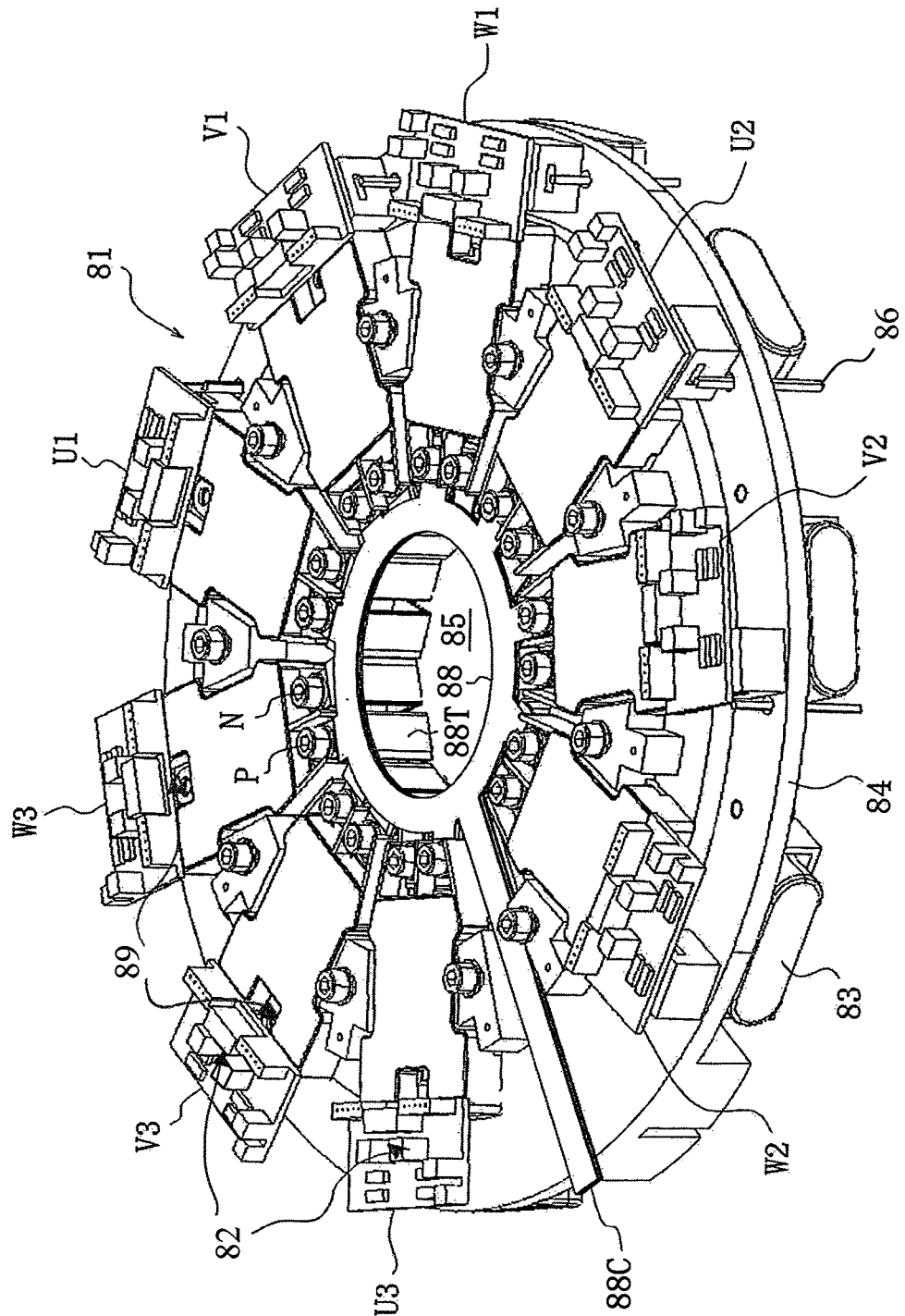
FIG. 13 is a perspective view of the other side of the power conversion apparatus illustrated in FIG. 12 in accordance with the eighth embodiment of the present invention.

Referring now to FIGS. 12 and 13, a power conversion apparatus 81 in accordance with an eighth embodiment will now be explained. In view of the similarity between the first through eighth embodiments, the parts of the eighth embodiment that are identical to the parts of the previous embodiments will be given the same reference numerals as the parts of the previous embodiments. Moreover, the descriptions of the parts of the eighth embodiment that are identical to the parts of the previous embodiments may be omitted for the sake of brevity.

FIG. 12 is a perspective view of one side (second side) of the power conversion apparatus 81 in accordance with the eighth embodiment of the present invention, and FIG. 13 is a perspective view of the other side (first side) of the power conversion apparatus 81, which is opposite from the side illustrated in FIG. 12.

As shown FIGS. 12 and 13, the power conversion apparatus 81 of the eighth embodiment has a generally annular form. The power conversion apparatus 81 is configured and arranged to output nine-phase alternating current. Thus, the power conversion apparatus 81 includes nine power modules U1, V1, W1, U2, V2, W2, U3, V3, and W3, nine capacitors 83, an annular substrate 84, and a bus bar 88. A rotor shaft (not shown) passes through a hole 85 formed in the center of the substrate 84. As shown in FIG. 12, the nine capacitors 83 are arranged in a circular fashion around the hole 85 on one side (second side) of the substrate 84. As shown in FIG. 13, the nine power modules U1, V1, W1, U2, V2, W2, U3, V3, and W3 are arranged around the hole 85 in order as listed in the clockwise direction on the other side (first side) of the substrate 84 that is opposite from the side illustrated in FIG. 12.

As shown in FIGS. 12 and 13, a control terminal 86 extends from each of the power modules U1, V1, W1, U2, V2, W2, U3, V3, and W3 so as to pass through the substrate 84 from the first side and protrude from the second side of the substrate 84. The control terminals 86 are configured and arranged to receive control commands from a motor controller or the like (not shown) in order to control the ON/OFF switching of the switching elements of the power modules U1, V1, W1, U2, V2, W2, U3, V3, and W3. As shown in FIG. 13, each of the power modules U1, V1, W1, U2, V2, W2, U3, V3, and W3 is provided with a drive circuit 82 and a current sensor. The drive circuit 82 is configured and arranged to produce a drive voltage for the switching element of the power modules U1, V1, W1, U2, V2, W2, U3, V3, and W3 based on the control command received by the control terminal 86. The current sensor is configured and arranged to detect the current passing through a coil connected to an alternating current terminal 89 (discussed later).

As shown in FIG. 13, each of the power modules U1, V1, W1, U2, V2, W2, U3, V3, and W3 is provided with the alternating current terminal 89 that is electrically connected to a motor coil of a multiple-phase alternating current motor such as the multiple-phase alternating current motor 12 shown in FIG. 1. The power modules U1, V1, W1, U2, V2, W2, U3, V3, and W3 are configured and arranged to deliver a multiple-phase alternating current to the motor coils.

Thus, when the power conversion apparatus 81 in accordance with the eighth embodiment is applied to an electromechanical motor such as the multiple-phase alternating current motor 12 shown in FIG. 1, the distance from the power conversion apparatus 81 to the motor coils of the multiple-phase alternating current motor can be shortened if the motor is arranged such that the power modules U1, V1, W1, U2, V2, W2, U3, V3, and W3 are sandwiched between the capacitors 83 and the stator cores of the multiple-phase alternating current motor. As a result, the impedance between the motor coils and the power modules can be minimized.

Moreover, the power conversion apparatus 81 preferably includes a passage configured for a coolant to pass through inside the substrate 84. The coolant enters through an inlet 84I shown in FIG. 12, flows through the inside of the substrate 84, and exits from an outlet 84O. This flow of coolant cools the power conversion apparatus 81. With the present invention, the cooling efficiency can be improved because the substrate 84 provided with the cooling function is sandwiched between the power modules U1, V1, W1, U2, V2, W2, U3, V3, and W3 and the capacitors 83. Additionally, the power conversion apparatus 81 can be cooled using the axial space of the electromechanical motor.

The positive electrode terminals P and the negative electrode terminals N of the power modules U1, V1, W1, U2, V2, W2, U3, V3, and W3 are provided near the hole 85 on the end portions of the power modules U1, V1, W1, U2, V2, W2, U3, V3, and W3 that face radially inward. The positive and negative electrode terminals P and N of the power modules U1, V1, W1, U2, V2, W2, U3, V3, and W3 are electrically connected with the bus bar 88 that has an inner diameter approximately equal to the diameter of the hole 85. The bus bar 88 has a disk-shaped form that is similarly arranged as to the bus bar 8 including the upper bus bar portion 8N, the lower bus bar portion 8P and the insulation layer 8I that are affixed to each other in a layered fashion as shown in FIG. 8. As shown in FIG. 13, the bus bar 88 has an annular disk shape with a hole in the middle for passing the rotary shaft of the motor.

As shown in FIG. 13, the bus bar 88 includes a connecting part 88C disposed on an outer edge portion of the bus bar 88. The connecting part 88C is configured to extend radially outward. The connecting part 88C is electrically connected to a direct current source (not shown). The bus bar 88 further includes a plurality of tongue portions (tab portions) 88T that extend in a direction substantially perpendicular to a ring portion of the bus bar 88. The bus bar 88 is arranged closely adjacent to the power modules U1, V1, W1, U2, V2, W2, U3, V3, and W3 and is attached to the positive and negative electrode terminals of the power modules U1, V1, W1, U2, V2, W2, U3, V3, and W3. The tongue portions 88T pass through the hole 85 of the substrate 84 and the distal ends of the tongue portions 88T are electrically connected to the positive and negative electrode terminals of the capacitors 83 as shown in FIG. 12. Similarly to the arrangement illustrated in FIG. 8, the lower plate-shaped portion (8P in FIG. 8) of the bus bar 88 is connected to the positive terminals of the power modules U1, V1, W1, U2, V2, W2, U3, V3, and W3 and the capacitors 83, and the upper plate-shaped portion (8N in FIG. 8) of the bus bar 88 is electrically connected to the negative terminals of the power modules U1, V1, W1, U2, V2, W2, U3, V3, and W3 and the capacitors 83.

In the eighth embodiment, since the positive and negative electrode terminals of the power modules U1, V1, W1, U2, V2, W2, U3, V3, and W3 are electrically connected via the ring portion of the bus bar 8 (which constitutes the inter-phase current paths), the distances between the power modules U1, V1, W1, U2, V2, W2, U3, V3, and W3 can be shortened and the impedances of the inter-phase current paths can be made small. Since the tongue portions 88T (which constitute the intra-phase current paths) extend from the ring portion of the bus bar 88 and are electrically connected to the positive and negative electrode terminals of the capacitors 83 at the distal ends thereof, the distances between the power modules U1, V1, W1, U2, V2, W2, U3, V3, and W3 and the corresponding capacitors 83 can be lengthened and the impedances of the intra-phase current paths can be made larger than the impedances of the inter-phase current paths. This configuration of the ring portion of the bus bar 88 and tongue portions 88T makes it easy to design the power conversion apparatus 81 to have the desired impedances.

With the eighth embodiment, the impedances of the inter-phase current paths between adjacent power modules, e.g., between the power modules U1 and V1 or between the power modules V1 and W1, etc., can be made small such that ripple currents cancel each other out.

Additionally, since the ripple current between the power modules W1 and U1 can be cancelled out by canceling out the ripple currents between the power modules W1 and U2 and the power modules U1 and W3, the inter-phase distances can be defined solely in terms of the distances between adjacent power modules. As a result, the impedances of the inter-phase current paths can be made much smaller than in a power conversion apparatus equipped with three power modules.

When a nine-phase configuration is adopted and the impedances of the inter-phase current paths are very small as in the eighth embodiment as shown in FIGS. 12 and 13, the balance of the impedances of the bus bar 88 can be disrupted by even a slight amount of manufacturing error and there is the risk that the loads born by the capacitors 83 will be uneven. In order to avoid this problem, it is acceptable to form the tongue portions 88T as separate members, i.e., as discrete bus bars, instead of forming the tongue portions 88T as integral portions of the annular bus bar 88. In such a case, discrete bus bars are connected between the power module terminals and the capacitor terminals. In such a case, the discrete bus bars constitute the intra-phase current paths. By using discrete bus bars, variation (unevenness) in the service life of the capacitors 83 can be suppressed.

Since the power conversion apparatus 81 of the eighth embodiment employs the several power modules U1, V1, W1, U2, V2, W2, U3, V3, and W3 and the several capacitors 83, the power modules U1, V1, W1, U2, V2, W2, U3, V3, and W3 and capacitors 83 can be easily arranged in a circular fashion so as to obtain an annular entity and the rotary shaft of the motor can be passed through the power conversion apparatus 81. Thus, a power conversion apparatus 81 in accordance with the eighth embodiment is well-suited for use in an electromechanical motor.

The power conversion apparatus 81 of the eighth embodiment is not limited to nine phases. For example, a power conversion apparatus could be configured to output three-phase alternating current by using nine power modules U1, V1, W1, U2, V2, W2, U3, V3, and W3 (where "9" is the product of the "3" of the three phases and the integer "3") and separating the power modules U1, V1 W1, U2, V2, W2, U3, V3, and W3 into three groups of three power modules each. More specifically, the power modules U1, V1, W1, U2, V2, W2, U3, V3, and W3 could be separated into a group comprising the power modules U1, V1 and W1, a group comprising the power modules U2, V2 and W2, and a group comprising the power modules U3, V3 and W3. The power modules could then be organized into a first group, a second group, and a third group and arranged in a circular fashion as shown in FIG. 13. A multiple-phase alternating current motor used with this power conversion apparatus 81 would have a number of motor coils equal to the number of power modules U1, V1, W1, U2, V2, W2, U3, V3, and W3 and each of the motor coils would be electrically connected to a respective power module with the alternating current terminal 86.

With this configuration, the impedances between the motor coils and the power modules U1, V1, W1, U2, V2, W2, U3, V3, and W3 can be minimized. Additionally, the internal impedances of the electromechanical motor can be balanced. As a result, the loads imposed on the capacitors 83 can be reduced even further and the variation (unevenness) of the loads can be alleviated, thereby enabling the size of the capacitors 83 to be reduced.

Similarly, by selecting (grouping) the number of power modules appropriately, the power conversion apparatus exemplified in FIGS. 12 and 13 can be configured to output three-phase or six-phase alternating current.

Each of the power conversion apparatuses 1, 21, 31, 41, 51, 61, 71 and 81 of the first through eighth embodiments is capable of achieving a large degree of cancellation of the ripple currents between the different phases and reducing the amount of the ripple current that flows to the capacitors because, taking the U-phase as a representative example of the phases, the impedances of the inter-phase current paths electrically connecting the terminals of the power module of the U-phase to the terminals of the power modules of the V-phase and W-phase is smaller than the impedances of the intra-phase current paths electrically connecting the terminals of the power module to the terminals of the corresponding capacitor within the U-phase. As a result, the size of the capacitors can be reduced and the size of the power conversion apparatus can be reduced. Additionally, it is not necessary for the distance between the power module and the capacitor within each phase to be long, and large surge currents can be prevented from flowing to the power modules.

Additionally, in the power conversion apparatuses 1, 21, 31, 41, 51, 61, 71 and 81 of the first through eighth embodiments, the impedance of an inter-phase current path between two adjacent power modules is smaller than the sum of the impedance of an intra-phase current path of one of the phases and the internal impedance of the capacitor corresponding to the phase. As a result, the effect of enabling the size of the capacitors to be reduced can be strengthened.

In the power conversion apparatuses 41, 61, 71 and 81 of the fourth, sixth, seventh and eighth embodiments, the impedances of the intra-phase current paths within each phase are the same for every phase. As a result, the surge voltages of the power modules are equal to one another and a stable electric power conversion can be accomplished.

In the power conversion apparatuses 21, 41, 61, 71 and 81 of the second, fourth, sixth, seventh and eighth embodiments, the impedances of the inter-phase current paths between power modules are the same for all phases. As a result, fluctuations of the ripple current cancellation can be prevented and a stable electric power conversion can be accomplished.

In the power conversion apparatuses 21, 41, 61, 71 and 81 of the second, fourth, sixth, seventh and eighth embodiments, the several power modules are arranged in a circular fashion as shown in FIGS. 5, 7, 10, and 11. In other words, the power modules are arranged on the common imaginary circle A. The positive (P) and negative (N) electrode terminals of the power modules are arranged on portions of the power modules disposed toward the inner side of the imaginary circle A. As a result, the distances between the positive and negative electrode terminals of the power modules and the distance between the adjacent power modules can be shortened. Therefore, the impedances of the inter-phase current paths between the power modules can be reduced, thereby enabling the effects described above to be obtained.

In the power conversion apparatuses 21, 41, 61, 71 and 81 of the second, fourth, sixth, seventh and eighth embodiments, both the positive electrode terminal P and the negative electrode terminal N of each power module are provided on an end of the power module facing toward the inner side of the imaginary circle A that corresponds to the arrangement of the power modules. As a result, the distances between the terminals of the power modules can be made even shorter.

In the power conversion apparatuses 1, 21, 31, 41, 51, 61, 71 and 81 of the first through eighth embodiments, at least the positive electrode terminals or the negative electrode terminals of the power modules are all arranged on the common imaginary circle A ($A_P$ or $A_N$ in the case of the first embodiment). As a result, the distances between the terminals of the power modules can be shortened and the impedances of the inter-phase current paths between the power modules can be reduced.

In the power conversion apparatuses 21, 61, 71 and 81 of the second, sixth, seventh and eighth embodiments, all of either the positive electrode terminals or the negative electrode terminals are arranged on the imaginary circle with equal circumferential spacing there-between. As a result, the impedances of the inter-phase current paths between the power modules of each of the phases can be made substantially equal for all phases.

In the power conversion apparatuses 21 and 31 of the second and third embodiments, the positive and negative electrode terminals arranged on the imaginary circle A are provided on one end portion of the main body of each of the power modules and the other end portions of the main bodies of the power modules are arranged outside the imaginary circle A.

In the power conversion apparatus 31 of the third embodiment, the power modules are arranged such that the imaginary lines L joining the positive electrode terminal and the negative electrode terminal of each power module are perpendicular to the imaginary circle A. As a result, the relative distances between the terminals of the respective power modules can be shortened even further.

In the power conversion apparatuses 21, 61, 71 and 81 of the second, sixth, seventh and eighth embodiment, the positive electrode terminals and the negative electrode terminals of all of the power modules are arranged in a circular fashion with equal circumferential spacing on the imaginary circle A. As a result, the impedances of the inter-phase current paths of the power modules can be made the same for all phases and the design of electric circuitry including the power conversion apparatus can be accomplished more easily.

In the power conversion apparatuses 41, 51, 61 and 71 of the fourth, fifth sixth and seventh embodiments, the distances between the terminals of the power modules are shorter than the distances between the terminals of each power module and the terminals of the respective capacitor that is electrically connected thereto. In the power conversion apparatus 81 of the eighth embodiment, the distances between the terminals of the power modules U1 and W3 are shorter than the distances from the terminals of the power modules to the terminals of the respective capacitors 83, which are substantially equal to the lengths of the tongue portions 88T. As a result, the impedances of the inter-phase current paths between the power modules can be made smaller than the impedances of the intra-phase current paths.

In the power conversion apparatuses 61 and 71 of the sixth and seventh embodiments, all of the positive electrode terminals and the negative electrode terminals of the capacitors are arranged on the common imaginary circle B with equal circumferential spacing therebetween. Moreover, the imaginary circle B is arranged concentrically with respect to the imaginary circle A. As a result, the ripple currents can be distributed evenly among the capacitors.

In the power conversion apparatuses 61 and 71 of the sixth and seventh embodiments, the diameter of the imaginary circle A is smaller than one half of the diameter of the imaginary circle B (more precisely, the diameter of the imaginary circle A is smaller than the distance between the imaginary circle A and the imaginary circle B). As a result, the impedances of the inter-phase current paths between the power modules can be made smaller than the impedances of the intra-phase current paths.

In an electromechanical motor equipped with the power conversion apparatus 81 of the eighth embodiment, the power conversion apparatus 81 is a circular disk-shaped member as shown in FIG. 13 which is centered on the rotary shaft of the motor. The power modules U1, V1, W1, U2, V2, W2, U3, V3, and W3 are arranged in a circular fashion in the circumferential direction of the circular disk-shaped member. As a result, the power conversion apparatus 81 for nine-phase alternating current can be obtained in which the impedances of the inter-phase current paths are much smaller than in a power conversion apparatus for three-phase alternating current. Additionally, the power conversion apparatus 81 is well-suited for use in an electromechanical motor because the rotor shaft of the motor can be passed through the hole 85 of the power conversion apparatus 81.

Moreover, in the electromechanical motor equipped with the power conversion apparatus 81 of the eighth embodiment, the power conversion apparatus 81 can be provided with a number of power modules (e.g., nine) that is equal to the product of the number of phases of the multiple-phase alternating current (e.g., three) and a prescribed integer (e.g., 3). Then, the power modules can be divided into a number of groups equal to the prescribed integer. For example, the power modules of a power conversion apparatus with nine power modules can be divided into three groups. In other words, the power modules U1, V1, W1, U2, V2, W2, U3, V3, and W3 of the power conversion apparatus 81 can be arranged in a circular fashion such that a group comprising the power modules U1, U2 and U3 corresponds to one phase, a group comprising the power modules V1, V2 and V3 corresponds to another phase, and a group comprising the power modules W1, W2 and W3 corresponds to still another phase, thus obtaining a power conversion apparatus for producing three-phase alternating current.

In such a case, the impedance of the inter-phase current paths can be defined based on three phases. More specifically, by arranging the power modules such that they appear in the clockwise order U1, V1, W1, U2, V2, W2, U3, V3, W3 when viewed from the axial direction, inter-phase canceling out of ripple currents can be achieved between the power modules U1 and V1, the power modules V1 and W1, and the power modules W1 and U1. Additionally, since the ripple current between the power modules W1 and U1 (which are farther apart) can be cancelled out by canceling out the ripple currents between the power modules W1 and U2 and the power modules U1 and W3, the inter-phase distances can be defined solely in terms of the distances between adjacent power modules. As a result, the impedances of the inter-phase current paths can be made to be much smaller than in a power conversion apparatus for three-phase alternating current that is provided with only three power modules.

When the multiple-phase alternating current motor has nine motor coils, each of the motor coils can be connected directly to the alternating current terminal 86 of one of the power modules U1, V1, W1, U2, V2, W2, U3, V3, and W3. As a result, the impedances between the motor coils and the power modules can be minimized.

In the electromechanical motor equipped with the power conversion apparatus 81 of the eighth embodiment, the power modules U1, V1, W1, U2, V2, W2, U3, V3, and W3 and the bus bar 88 constituting the inter-phase current paths are arranged on the first side of the plate-shaped substrate 84 as shown in FIG. 13 and the capacitors 83 are arranged on the second side of the substrate 84 as shown in FIG. 12. By providing the tongue portions 88T that extend from the ring portion of the bus bar 88 toward the capacitors 83, a configuration can be obtained in which the impedances of the inter-phase current paths are small and the impedances of the intra-phase current paths are large.

Additionally, in the electromechanical motor equipped with the power conversion apparatus 81 of the eighth embodiment, the tongue portions 88T can be replaced with a plurality of discrete bus bars arranged to span from each of the power modules U1, V1, W1, U2, V2, W2, U3, V3, and W3 to the corresponding capacitor 83. In this arrangement, the discrete bus bars form the intra-phase current paths and are separate from the bus bar 88, which forms the inter-phase current paths. In this way, variation (unevenness) of the loads born by the capacitors 83 can be suppressed, and thus, variation of the service life of the capacitors 83 can be prevented.

In the electromechanical motor equipped with the power conversion apparatus 81 of the eighth embodiment, a coolant passage for circulating a coolant is provided in the plate-shaped substrate 84. By passing the coolant through the coolant passage from the inlet 841 to the outlet 840, the power modules U1, V1, W1, U2, V2, W2, U3, V3, and W3 and the capacitors 83 provided on both sides of the substrate 84 can be cooled efficiently. Therefore, the cooling efficiency of the power conversion apparatus 81 is improved.

The configurations described heretofore are merely embodiments of the present invention and various modifications can be made without departing from the scope of the present invention. For example, the present invention is not limited to the three-phase configurations described in the illustrated embodiments. Rather, the power conversion apparatus of the present invention can be applied to six-phase configurations, nine-phase configurations, and other configurations involving even larger numbers of phases. By employing the power conversion apparatus in accordance with the present invention in an electromechanical motor, the power modules can be arranged close to the coils, i.e., the power modules and the coils can be connected in a low-impedance manner. As a result, the surge voltages can be reduced. Furthermore, the application of power conversion apparatuses in accordance with the present invention is not limited to electromechanical motors.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power conversion apparatus comprising:
   a plurality of power modules with each of the power modules having a direct current terminal section and an alternating current terminal section, each of the power modules being configured and arranged to convert a direct current inputted from the direct current terminal section into a respective phase of a multiple-phase alternating current and to output the multiple-phase alternating current to the alternating current terminal section;
   a plurality of capacitors with each of the capacitors being arranged with respect to a corresponding one of the power modules; and
   a bus bar forming an inter-phase current path that allows current to flow between the power modules that are adjacent and forming an intra-phase current path between one of the power modules and a corresponding one of the capacitors such that an impedance of the inter-phase current path is smaller than an impedance of the intra-phase current path.

2. The power conversion apparatus recited in claim 1, wherein
the bus bar is configured and arranged such that the impedance of the intra-phase current path is the same for all phases of the multiple-phase alternating current.

3. The power conversion apparatus recited in claim 1, wherein
the power modules are arranged at equidistant intervals about a first imaginary circle such that the impedance of the inter-phase current path is the same for all the power modules that are adjacent to one another.

4. The power conversion apparatus recited in claim 3, wherein
the direct current terminal section of each of the power modules is disposed on one side of the power module that is arranged towards an inner side of the first imaginary circle.

5. The power conversion apparatus recited in claim 4, wherein
the direct current terminal section of each of the power modules has positive and negative direct current terminals that are both disposed on the one sides of the power modules that are arranged towards the inner side of the first imaginary circle.

6. The power conversion apparatus recited in claim 5, wherein
at least one of all of the positive direct current terminals and all of the negative direct current terminals of the power modules are arranged on the first imaginary circle.

7. The power conversion apparatus recited in claim 5, wherein
all of the positive and negative direct current terminals of the power modules are arranged on the first imaginary circle.

8. The power conversion apparatus recited in claim 5, wherein
the positive and negative direct current terminals of each of the power modules are arranged such that an imaginary line passing through the positive and negative direct current terminals of each of the power modules is perpendicularly oriented relative to a plane containing the first imaginary circle.

9. The power conversion apparatus recited in claim 6, wherein each of the capacitors has positive and negative electrode terminals that are both arranged on a second imaginary circle that is different from the first imaginary circle.

10. The power conversion apparatus recited in claim 9, wherein
the positive and negative electrode terminals of the capacitors are arranged about the second imaginary circle with equal spacing therebetween in a circumferential direction.

11. The power conversion apparatus recited in claim 10, wherein
the positive and negative electrode terminals of the capacitors are arranged such that the second imaginary circle is concentric with the first imaginary circle and a diameter of the first imaginary circle is equal to or smaller than one half of a diameter of the second imaginary circle.

12. The power conversion apparatus recited in claim 1, wherein
the bus bar forms the inter-phase current path and the intra-phase current path such that the impedance of the inter-phase current path is smaller than the impedance of the intra-phase current path with the impedance of the intra-phase current path being defined as a sum of an impedance of a current path between one of the power modules and a corresponding one of the capacitors and an internal impedance of the corresponding one of the capacitors.

13. A power conversion apparatus comprising:
a plurality of power modules with each of the power modules having a direct current terminal section and an alternating current terminal section, each of the power modules being configured and arranged to convert a direct current inputted from the direct current terminal section into a respective phase of a multiple-phase alternating current and to output the multiple-phase alternating current to the alternating current terminal section;
a plurality of capacitors with each of the capacitors being arranged with respect to a corresponding one of the power modules;
a bus bar forming an inter-phase current path between the power modules that are adjacent and forming an intra-phase current path between one of the power modules and a corresponding one of the capacitors such that an impedance of the inter-phase current path is smaller than an impedance of the intra-phase current path; and
a circular disk-shaped substrate with the power modules being arranged on a first side of the disk-shaped substrate, and the capacitors being arranged on a second side of the disk-shaped substrate, which is opposite from the first side.

14. The power conversion apparatus recited in claim 13, wherein
the power modules are arranged radially on the first side of the disk-shaped substrate such that the direct current terminal section of each of the power modules is disposed on one side of the power module that is arranged towards a center portion of the disk-shaped substrate, and
the capacitors are arranged radially on the second side of the disk-shaped substrate such that a direct current terminal section of each of the capacitors is disposed on one side of the capacitor that is arranged towards the center portion of the disk-shaped substrate.

15. The power conversion apparatus recited in claim 14, wherein
the bus bar has a ring portion that electrically connects the direct current terminal sections of the power modules to form the inter-phase current path.

16. The power conversion apparatus recited in claim 15, wherein
the bus bar includes a plurality of tab portions extending from the ring portion, which is connected to the direct current terminal sections of the power modules, towards the second side of the disk-shaped substrate so that each of the tab portions is connected to the direct current terminal section of a corresponding one of the capacitors.

17. The power conversion apparatus recited in claim 13, wherein
the disk-shaped substrate includes a coolant passage configured and arranged to circulate a coolant inside of the disk-shaped substrate.

18. A multiple-phase alternating current motor drive system comprising:
a motor housing unit having a generally cylindrical shape;

a plurality of stators arranged around an inner circumference of the motor housing unit, each of the stators having a coil;

a rotor supported in the motor housing unit such that the rotor can rotate freely; and a power conversion apparatus arranged at an axial end portion of the motor housing unit, the power conversion apparatus including a plurality of power modules with each of the power modules having a direct current terminal section and an alternating current terminal section, each of the power modules being configured and arranged to convert a direct current inputted from the direct current terminal section into a respective phase of a multiple-phase alternating current and to output the multiple-phase alternating current to the alternating current terminal section connected to the coil of a corresponding one of the stators;

a plurality of capacitors with each of the capacitors being arranged with respect to a corresponding one of the power modules; and a bus bar forming an inter-phase current path that allows current to flow between the power modules that are adjacent and forming an intra-phase current path between one of the power modules and a corresponding one of the capacitors such that an impedance of the inter-phase current path is smaller than an impedance of the intra-phase current path.

19. A multiple-phase alternating current motor drive system comprising:

a motor housing unit having a generally cylindrical shape;

a plurality of stators arranged around an inner circumference of the motor housing unit, each of the stators having a coil;

a rotor supported in the motor housing unit such that the rotor can rotate freely; and a power conversion apparatus arranged at an axial end portion of the motor housing unit, the power conversion apparatus including a plurality of power modules with each of the power modules having a direct current terminal section and an alternating current terminal section, each of the power modules being configured and arranged to convert a direct current inputted from the direct current terminal section into a respective phase of a multiple-phase alternating current and to output the multiple-phase alternating current to the alternating current terminal section connected to the coil of a corresponding one of the stators;

a plurality of capacitors with each of the capacitors being arranged with respect to a corresponding one of the power modules;

a bus bar forming an inter-phase current path between the power modules that are adjacent and forming an intra-phase current path between one of the power modules and a corresponding one of the capacitors such that an impedance of the inter-phase current path is smaller than an impedance of the intra-phase current path; and a circular disk-shaped substrate with the power modules being arranged on a first side of the disk-shaped substrate and the capacitors being arranged on a second side of the disk-shaped substrate, which is opposite from the first side.

20. The multiple-phase alternating current motor drive system recited in claim 19, wherein the disk-shaped substrate is centered on a rotary shaft coupled to the rotor so that the rotary shaft passes through a center hole formed at a center portion of the disk-shaped substrate.

* * * * *